(12) United States Patent
Takahashi

(10) Patent No.: US 7,063,349 B2
(45) Date of Patent: Jun. 20, 2006

(54) INTERIOR MEMBER HAVING AN AIRBAG DOOR SECTION FOR USE IN VEHICLES, AND ITS MOLDING METHOD

(75) Inventor: Hideaki Takahashi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/753,358

(22) Filed: Jan. 9, 2004

(65) Prior Publication Data

US 2004/0140652 A1    Jul. 22, 2004

Related U.S. Application Data

(62) Division of application No. 10/396,554, filed on Mar. 26, 2003, now Pat. No. 6,733,713, which is a division of application No. 09/194,355, filed as application No. PCT/JP98/01207 on Mar. 20, 1998, now Pat. No. 6,612,607.

(30) Foreign Application Priority Data

Mar. 26, 1997 (JP) ...................................... 9-73702
Jul. 29, 1997 (JP) .................................. 9-203237
Nov. 7, 1997 (JP) .................................. 9-305357

(51) Int. Cl.
    *B60R 21/16* (2006.01)
(52) U.S. Cl. ................ 280/728.2; 280/728.3; 280/732
(58) Field of Classification Search ............ 280/728.1, 280/728.2, 728.3, 732
    See application file for complete search history.

(56) References Cited

U.S. PATENT DOCUMENTS

| 4,895,389 A | 1/1990 | Pack, Jr. |
| 4,989,896 A | 2/1991 | DiSalvo et al. |
| 5,082,310 A | 1/1992 | Bauer |
| 5,135,253 A | 8/1992 | Hirashima et al. |
| 5,375,876 A | 12/1994 | Bauer et al. |
| 5,390,950 A * | 2/1995 | Barnes et al. ............ 280/728.3 |

(Continued)

FOREIGN PATENT DOCUMENTS

DE        44 36 130 A1     3/1995

(Continued)

*Primary Examiner*—Paul N. Dickson
*Assistant Examiner*—Toan C. To
(74) *Attorney, Agent, or Firm*—Oliff & Berridge, PLC

(57) ABSTRACT

A tear portion is formed at a substantially center portion in a longitudinal direction and at both end portions in a lateral direction of an air bag door portion of an instrument panel so as to be formed in an H shape in a plan view. In the air bag door portion, protrusions are protruded downward at positions at both sides in a longitudinal direction of an automotive vehicle having therebetween a center portion of the tear portion, these protrusions being integrally formed with the air bag door portion. Accordingly, it is structured such that during expansion of the air bag body, the expanding air bag body abuts lower surfaces of the protrusions, so as to press the protrusions upward. Therefore, even in a case wherein the air bag door portion and the main body portion of the trim member for the automotive vehicle are formed of the same resin, a quality of an outer appearance is not deteriorated, and a break force of a break portion of the air bag door portion is reduced to a desired value.

5 Claims, 40 Drawing Sheets

U.S. PATENT DOCUMENTS

| | | | |
|---|---|---|---|
| 5,393,089 A | 2/1995 | Pakulsky et al. | |
| 5,439,246 A | 8/1995 | Ravenberg et al. | |
| 5,456,490 A * | 10/1995 | Carter et al. | 280/728.3 |
| 5,458,361 A | 10/1995 | Gajewski | 280/728.3 |
| 5,499,842 A | 3/1996 | Yamamoto et al. | |
| 5,536,037 A | 7/1996 | Cherry | 280/728.3 |
| 5,564,731 A | 10/1996 | Gallagher et al. | |
| 5,580,083 A | 12/1996 | Parker | 280/728.3 |
| 5,590,901 A | 1/1997 | MacGregor | 280/728.3 |
| 5,590,903 A | 1/1997 | Phillion et al. | 280/728.3 |
| 5,611,564 A | 3/1997 | Bauer | |
| 5,698,283 A | 12/1997 | Yamasaki et al. | 280/728.3 X |
| 5,735,542 A | 4/1998 | Bohn | 280/728.2 |
| 5,755,459 A | 5/1998 | LaLonde | 280/728.3 |
| 5,839,752 A | 11/1998 | Yamasaki et al. | 280/728.3 |
| 5,913,534 A | 6/1999 | Klingauf | 280/728.3 |
| 5,941,558 A * | 8/1999 | Labrie et al. | 280/728.3 |
| 5,947,511 A | 9/1999 | Usui et al. | 264/255 |
| 5,979,931 A | 11/1999 | Totani et al. | 280/728.2 X |
| 6,039,342 A | 3/2000 | Sasaki | 280/728.2 X |
| 6,042,140 A | 3/2000 | Blazaitis et al. | 280/728.3 |
| 6,042,144 A | 3/2000 | Murakami et al. | 280/728.1 X |
| 6,065,771 A * | 5/2000 | Kawakubo et al. | 280/728.3 |
| 6,109,645 A | 8/2000 | Totani et al. | 280/728.3 |
| 6,726,239 B1 * | 4/2004 | Teranishi et al. | 280/728.3 |

FOREIGN PATENT DOCUMENTS

| | | |
|---|---|---|
| JP | A-2-109848 | 4/1990 |
| JP | U-2-60652 | 5/1990 |
| JP | A-2-147452 | 6/1990 |
| JP | A-2-283546 | 11/1990 |
| JP | 02-303949 | 12/1990 |
| JP | U-2-149346 | 12/1990 |
| JP | A-3-254919 | 11/1991 |
| JP | A-3-279055 | 12/1991 |
| JP | A-3-281457 | 12/1991 |
| JP | A-3-281547 | 12/1991 |
| JP | 04-303052 | 10/1992 |
| JP | A-5-185898 | 7/1993 |
| JP | U-6-1016 | 1/1994 |
| JP | 06-035057 | 5/1994 |
| JP | A-7-179161 | 7/1995 |
| JP | U-7-40429 | 7/1995 |
| JP | A-7-267036 | 10/1995 |
| JP | A-7-291078 | 11/1995 |
| JP | 7-315155 | 12/1995 |
| JP | A-8-20040 | 1/1996 |
| JP | A-8-85406 | 4/1996 |
| JP | Y2-2507843 | 5/1996 |
| JP | A-8-164814 | 6/1996 |
| JP | A-8-192666 | 7/1996 |
| JP | A-8-216216 | 8/1996 |
| JP | A-8-268205 | 10/1996 |
| JP | A-8-282332 | 10/1996 |
| JP | A-8-290749 | 11/1996 |
| JP | A-9-2180 | 1/1997 |
| JP | A-9-2181 | 1/1997 |
| JP | A-9-2187 | 1/1997 |
| JP | A-9-2188 | 1/1997 |
| JP | A-9-2189 | 1/1997 |
| JP | 09052567 | 2/1997 |
| JP | A-9-39706 | 2/1997 |
| JP | A-9-48313 | 2/1997 |

* cited by examiner

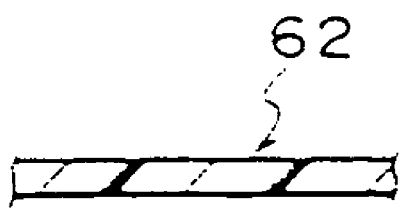
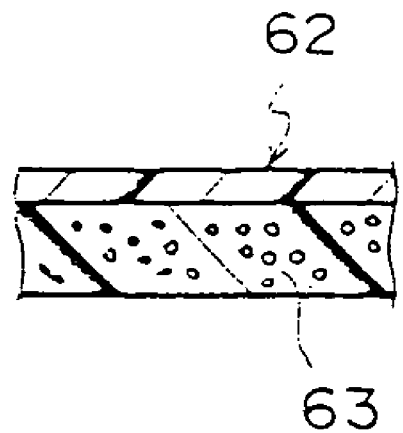

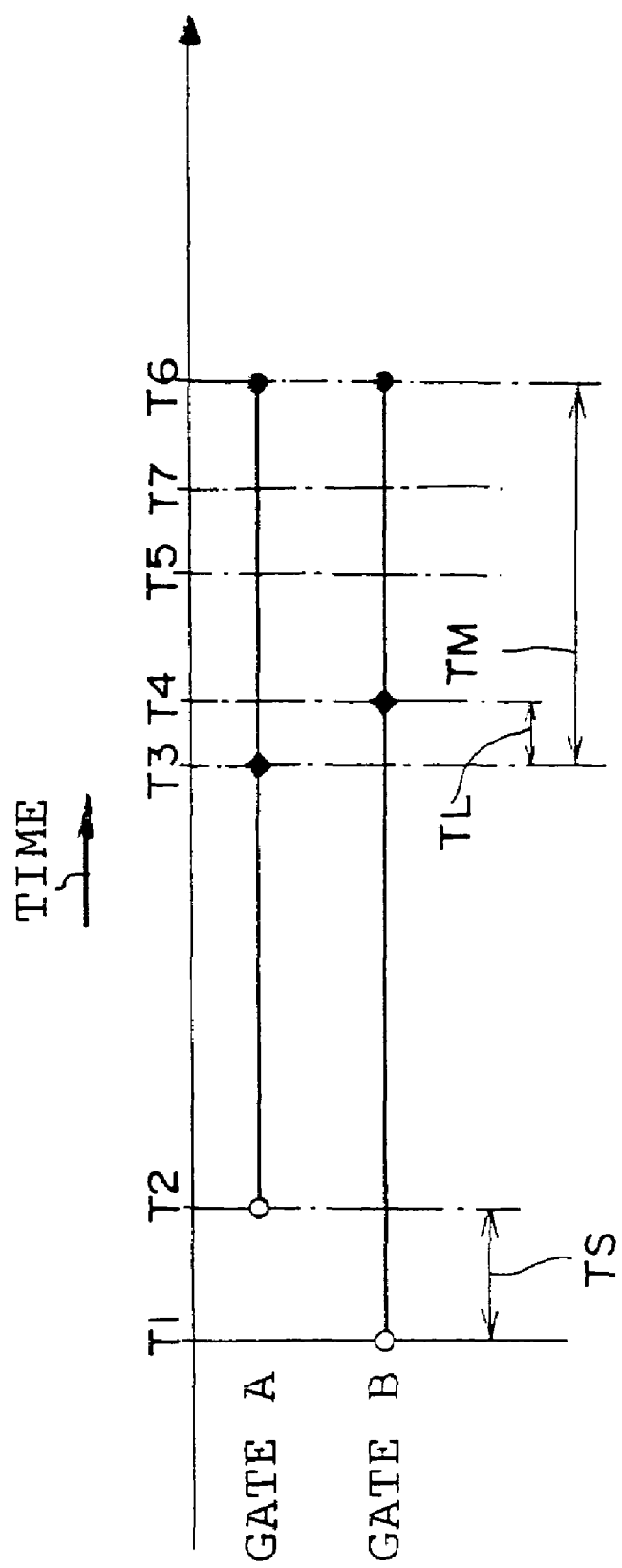

INTERIOR MEMBER HAVING AN AIRBAG DOOR SECTION FOR USE IN VEHICLES, AND ITS MOLDING METHOD

This is a Division of application Ser. No. 10/396,554 filed Mar. 26, 2003 now U.S. Pat. No. 6,733,713, which in turn is a Division of application Ser. No. 09/194,355 filed Nov. 20, 1998 now U.S. Pat. No. 6,612,607 B1 issued Sep. 2, 2003, which is a National Stage of International Application No. PCT/JP98/01207 filed Mar. 20, 1998. The entire disclosure of the prior applications is hereby incorporated by reference herein in its entirety.

BACKGROUND OF THE INVENTION

Conventionally, as an interior member of an automotive vehicle having an air bag door portion such as an instrument panel, a door trim, a center pillar and the like, there has been known a structure described in Japanese Patent Application Laid-Open (JP-A) No. 8-192666.

In the instrument panel having the air bag door portion disclosed in the above publication, a main body portion of the instrument panel and the air bag door portion are integrally formed by so-called dual-injection molding (double injection molding) wherein the air bag door portion (an opening portion) is injection molded with a thermoplastic elastomer, after a main body portion of the instrument panel having an opening portion for the air bag door is injection molded with a thermoplastic resin. Further, as a popularly known structure, there is an instrument panel to which an independent air bag door (injection molded with a thermoplastic elastomer) is later attached.

However, in the instrument panel having the air bag door portion mentioned above, in a case wherein the whole of the instrument panel is constructed of the same resin without replacing the resin of the air bag door portion with the resin of the main body portion, on the basis of characteristics of the resin in the main body portion, the rate of elasticity of the resin in the main body portion is 6 to 7 times higher than the rate of elasticity of the resin (TPO) in the air bag door portion, and the tensile strength in the main body portion is 1.5 to 2 times higher than the tensile strength in the air bag door portion; thus, the break force of a portion for expansion formed in the air bag door portion, an H-shaped break portion (a tear portion), for example, becomes higher in a case of the same thickness, so that it is hard for the air bag door portion to expand, and moreover, a hinge portion may break during expansion. If in order to solve this problem, the thickness of the resin in the break portion is made too thin, underfill, oil-can-like-feeling and deformation are generated. Particularly, in a hard resin instrument panel, since unevenness appears in a periphery of the thin portion at an outer appearance side due to weld shrinkage, an undulation and the like, the quality of the appearance of outer is lowered.

Further, in order to achieve a state wherein both a line of the break portion and an outer periphery of the air bag door portion are completely invisible from the outer appearance side (an invisible type), there is a method of making the break portion thick during molding and then cutting the break portion through a later process. However, in this method, it is very difficult to make the line in the break portion invisible while maintaining a predetermined break force. That is, when the thickness of the resin is made thin, the line and the undulation in the break portion are seen from the outer appearance side even in a case wherein a relief groove is provided, so that the quality of the outer appearance can not be maintained, and the thickness of the resin can not be made sufficiently thin.

When it is difficult to expand the door portion due to the increased break force required during expansion at the break portion (tear portion), which is formed at the air bag door portion, and in order to ameliorate this the thickness of the resin in the break portion is made too thin, the thin portion becomes visible from an outer side and so the quality of the exterior appearance deteriorates; this deficiency is also generated with respect to: a break portion of an interior member of an automotive vehicle (vehicle interior member) such as an instrument panel, door trim, center pillar, or the like, wherein the interior member is integrally formed in accordance with dual-injection molding, using different resins for the main body portion of the vehicle interior member and for the air bag portion; and a break portion of a vehicle interior member wherein the vehicle interior member is obtained by integrally assembling the air bag door portion and the main body portion of the instrument panel by means of a locking hook, a screw or the like, after independently molding the air bag door portion and the main body portion of the instrument panel.

As for technologies relating to the present invention, there are: Japanese Patent Application Laid-Open (JP-A) Nos. 3-281457 and 7-179161 in which stress is concentrated at a foaming layer and a skin in a door-integral foaming instrument panel during an initial period of expansion, Japanese Patent Application Laid-Open (JP-A) No. 2-147452 in which a bead is formed along a tear portion in a later attached resin door, Japanese Patent Application Laid-Open (JP-A) No. 5-185898 in which a blade is set at a distal end of a door metal plate insert in a door-integral foaming instrument panel, Japanese Patent Application Laid-Open (JP-A) No. 7-291078 in which a hinge portion is reinforced in a hard instrument panel obtained by integrally molding a door portion and a main body of the instrument panel, Japanese Patent Application Laid-Open (JP-A) No. 8-290749 in which a hinge portion is reinforced in a skin instrument panel obtained by integrally molding a door base member and an instrument panel base member, Japanese Patent Application Laid-Open (JP-A) No. 2-283546 in which a rib applying maximum shearing force to a tear portion of an independent door is integrally formed, Japanese Patent Application Laid-Open (JP-A) No. 2-109848 in which at a can lid, a thin line is formed in a resin layer so as to surround an opened portion and a weld line is set on the thin line, Japanese Patent Application Laid-Open (JP-A) No. 7-291078 in which a reinforcing member is thermally caulked on a reverse face of a door portion in a resin instrument panel and a notch is formed on a tear line of the door portion, and Japanese Patent Application Laid-Open (JP-A) No. 8-20040 in which a different kind of resin is injected by shielding a metal mold cavity by means of a shielding core so as to perform a core-back immediately before the injection is completed.

SUMMARY

The present invention has been made taking the above facts into consideration, and an object of the present invention is to obtain an interior member for an automotive vehicle having an air bag door portion in which the quality of the outer appearance is not deteriorated and the break force of a break portion in the air bag door portion can be reduced to a desired value even in a case of molding the air bag door portion and a main body portion of the trim member for the automotive vehicle with the same resin.

A first aspect of the present invention, there is comprises: a tear portion formed in the air bag door portion; and push-up means for pushing up a portion at both sides or one side of the air bag door portion having therebetween a center portion of the tear portion when a bag body of the air bag is expanded.

Accordingly, an impact load from the bag body of the air bag is concentrated at the center portion of the tear portion when the bag body of the air bag is expanded, and the center portion of the tear portion is smoothly broken. As a result, since the tear portion can be easily broken even when the thickness of the tear portion is large, it is possible to devise to reconcile expansion performance and the quality of the outer appearance (making invisible). Further, since the tear portion is broken first, a load at the hinge portion in the air bag door portion can be lightened. Still further, since the air bag door portion can be made of a hard material with high rigidity, an oil-can-like-feeling and deformation can be prevented.

Further, a second aspect of the present invention, comprises: a tear portion formed in the air bag door portion; and a door hinge portion protecting plate disposed below the air bag door portion, protruding toward a side of the tear portion rather than toward a hinge portion of the air bag door portion and having a high break force.

Accordingly, since the door hinge portion protecting plate is provided, the bag body of the air bag is prevented from being directly abutting the hinge portion of the air bag door portion when the air bag body is expanded, so that the hinge portion of the air bag door portion can be prevented from being broken by the bag body of the air bag. Further, since the hinge portion of the air bag door portion can be protected, breakage can be made with relative ease in the tear portion having a low strength.

Still further, a third aspect of the present invention comprises: a resin fluidizing boundary is set at a core back area, which is for forming a tear portion when the air bag door portion is expanded; and a line of the tear portion is not seen from a side of an outer appearance.

Accordingly, the break force in the break portion can be lowered to a desired value due to a reduction of strength caused by the resin fluidizing boundary, by setting the resin fluidizing boundary in the core back area for forming the break portion when the air bag door portion is expanded. Further, since it is not necessary to make the resin thickness of the break portion significantly thin, the line in the break portion can be made in a state of being fully invisible from the side of the outer appearance, so that the quality of the outer appearance can be prevented from being lowered, heat resistance and aging performance is improved, and support and surface rigidity of a whole of the air bag door portion can be also improved.

Furthermore, in a fourth aspect of the present invention, in the first aspect, the push-up means at a position at both sides or one side of the air bag door portion having therebetween a center portion of the tear portion is a protrusion which is integrally provided with the air bag door portion and which protrudes downward.

Accordingly, the impact load from the bag body of the air bag momentarily acts on the portion when the bag body of the air bag is expanded, and breakage is smoothly performed from the center portion of the tear portion. Further, it is possible to devise to reconcile the quality of the outer appearance and expansion performance through a simple structure in which the portion is merely provided in the air bag door portion.

Moreover, in a fifth aspect of the present invention, in the first aspect, the push-up means is disposed at a lower side of the air bag door portion, and is a metal plate providing a protrusion at at least one of an upper surface or a lower surface of a distal end portion that abuts, when the air bag body is expanded, a position at both sides or one side of the air bag door portion having therebetween the center portion of the tear portion.

Accordingly, due to the metal plate, the impact load from the bag body of the air bag acts on the center portion of the tear portion in a concentrated manner when the bag body of the air bag expands, so that breakage is smoothly performed from the center portion of the tear portion. As a result, it is possible to devise to reconcile the quality of the outer appearance and expansion performance. Further, the structure can be applied to a conventional trim member for an automotive vehicle by using the metal plate.

Further, in a sixth aspect of the present invention, in the first aspect, the push-up means is disposed at a lower side of the air bag door portion and is a metal plate providing a narrow protrusion at an upper surface of a distal end portion that abuts, when the air bag body is expanded, a position at both sides or one side of the air bag door portion having therebetween the center portion of the tear portion, when the air bag body is expanded.

Accordingly, due to the protrusion of the metal plate, the impact load from the bag body of the air bag acts on the center portion of the tear portion in a concentrated manner when the bag body of the air bag expands, so that breakage is smoothly performed from the center portion of the tear portion. At this time, the narrow projection is provided on the upper surface of the front end portion of the metal plate, whereby it is possible to reliably break from the center portion of the tear portion even when the upper surface of the bag body of the air bag is of an uneven shape during an initial period of expansion.

Still further, in a seventh aspect of the present invention, in the first aspect, the push-up means is disposed at a lower side of the air bag door portion and is a metal plate providing a distal end portion that abuts, when the air bag body is expanded, a portion at both sides or one side of the air bag door portion having therebetween the center portion of the tear portion when the air bag body is expanded; a hinge portion of the metal plate is off set toward a side of the tear portion rather than toward the hinge portion of the air bag door portion; and with respect to the hinge portion of the metal plate, a tear portion side position has more rigidity than a fixing portion of the metal plate and a hinge portion of the metal plate.

Accordingly, due to the distal end portion of the metal plate the impact load from the bag body of the air bag acts on the center portion of the tear portion in a concentrated manner when the bag body of the air bag expands, so that breakage is smoothly performed from the center portion of the tear portion. As a result, it is possible to devise to reconcile the quality of the outer appearance and expansion performance. Further, since it is possible due to the metal plate to prevent the bag body of the air bag from being directly abutting the hinge portion of the air bag door portion when the bag body of the air bag is expanded, it is possible to prevent breakage of the hinge portion of the air bag door portion due to the bag body of the air bag.

Furthermore, in an eighth aspect of the present invention, in the first aspect, a hinge portion of the air bag door portion is formed as a thin portion having a predetermined thickness across a predetermined longitudinal width and is adjacent to a case mounting portion, and a groove as a bending point is set in the middle of the longitudinal width of the thin portion.

Accordingly, since the bending point can be set apart from the case mounting portion at which the plate thickness suddenly changes, the rate of local expansion (the rate of the extension of the skin layer) due to bending can be reduced. Further, since the groove is formed at the bending point, the surface expansion length of the bending portion can be increased and the actual expansion rate can be made small, so that it is possible to effectively prevent the hinge portion from breakage due to bending when the bag body of the air bag is expanded.

Moreover, in a ninth aspect of the present invention, in the first aspect, the air bag door portion and the main body portion are integrally formed of the same hard resin material, or separately formed.

Accordingly, even in a case wherein the air bag door portion and the main body portion are integrally or separately formed of the same hard resin material, the impact load from the bag body of the air bag is concentrated at the center portion of the tear portion, so that breakage is smoothly performed from the center portion of the tear portion. As a result, since breakage is easily performed even when the thickness of the tear portion is thick, it is possible to reconcile a expansion performance and a quality of an outer appearance (making invisible). Further, since the tear portion is broken first, it is possible to reduce the load on the hinge portion in the air bag door portion. Still further, since the air bag door portion can be constituted of a hard material having a high rigidity, it is possible to prevent an oil-can-like-feeling and deformation.

Further, in a tenth aspect the present invention, in the first aspect, the air bag door portion and the main body portion are integrally formed of the same hard resin material or separately formed, and a surface of these base materials are covered with a skin with a common or separated tear portion with insert molding or attachment molding.

Accordingly, the impact load from the bag body of the air bag is concentrated at the center portion of the tear portion when the bag body of the air bag expands, so that the base member and the skin of the air bag door portion is smoothly broken. As a result, since breakage can be easily performed even when the thickness of the tear portion in the base member of the air bag door portion is made large, it is possible to reconcile expansion performance and restriction of reduction in the quality of the outer appearance (weld shrinkage and an swelling-shaped unevenness). Further, since it is possible to construct with the hard resin material having a high rigidity, it is possible to prevent an oil-can-like-feeling and deformation. Still further, in a case wherein the air bag door portion and the main body portion are integrally formed of the same hard resin material, a complex mold structure is not required in comparison with a dual-injection molding, and a post treatment of the base member is not required.

Still further, in an eleventh aspect of the present invention, in the first aspect, the air bag door portion and the main body portion are integrally formed of the same hard resin material or separately formed, and a foam layer and a skin with a tear portion commonly formed or separately formed are integrally formed on a surface of the base members thereof.

Accordingly, the impact load from the bag body of the air bag is concentrated at the center portion of the tear portion when the bag body of the air bag expands, so that the base member of the air bag door portion, the foamed layer and the skin are smoothly broken. As a result, since it is possible to easily cause breakage even if the thickness of the tear portion in the base member of the air bag door portion is made large, it is possible to reconcile expansion performance and prevention of underfill during molding. Further, since it is possible to construct with the hard resin material having a high rigidity, there is no swelling feeling which easily generates when estimating heat resistance or the like.

Furthermore, in a twelfth aspect of the present invention, in the third aspect, the main body portion and the air bag door portion of the trim member for the automotive vehicle integrally formed or separately formed are formed of the same resin in accordance with an injection molding.

Accordingly, by setting the resin fluidizing boundary at a core back area, which is for forming a tear portion during expansion of the air bag door portion, it is possible to lower the break force in the break force to a desired value, due to strength reduction which depends on the resin fluidizing boundary. Further, since it is not necessary to make the resin thickness of the break portion significantly thin, the line in the break portion can be made in a state of being fully invisible from the side of the outer appearance, the quality of the outer appearance can be prevented from being lowered, heat resistance and aging performance is improved, and support and surface rigidity of a whole of the air bag door portion can be also improved. Still further, in a case wherein the air bag door portion and the main body portion are integrally formed of the same resin, it is not necessary to paint the trim member for the automotive vehicle while separating into two kinds of materials, so that low cost can be achieved.

Moreover, in a thirteenth aspect of the present invention, in the third aspect, a main body portion and the air bag door portion of the trim member for the automotive vehicle has an air bag door portion integrally formed using different resins in accordance with dual-injection molding.

Accordingly, even in the trim member for the automotive vehicle having the air bag door portion integrally formed by the dual-injection molding, by setting the resin fluidizing boundary at the core back area which is for forming the break portion when the air bag door portion is expanded the break force in the break portion can be lowered to a desired value, due to strength reduction which depends on the resin fluidizing boundary. Further, since it is not necessary to make the resin thickness of the break portion significantly thin, the line in the break portion can be made in a state of being fully invisible from the side of the outer appearance, the quality of the outer appearance can be prevented from being lowered, heat resistance and aging performance is improved, and support and surface rigidity of a whole of the air bag door portion can be also improved.

Moreover, in a fourteenth aspect of the present invention, in the third aspect, a main body portion of a base member and the air bag door portion of the trim member for the automotive vehicle, which are integrally formed or separately formed, are formed using the same resin in accordance with injection molding, the base member having an air bag door portion covered by a skin having a tear portion or lacking a tear portion.

Accordingly, even in the trim member for the automotive vehicle having a so-called skin insert and a skin attachment type air bag door portion wherein the base member is covered by the skin having the tear portion or lacking the tear portion, by setting the resin fluidizing boundary at the core back area which is for forming the break portion when the air bag door portion is expanded the break force in the break portion can be lowered to a desired value, due to a strength reduction which depends on the resin fluidizing boundary. Further, since it is not necessary to make the resin thickness of the break portion significantly thin, the quality of the outer appearance transferred to the skin can be prevented from being lowered, heat resistance and aging performance is improved, and support and surface rigidity of a whole of the air bag door portion can be also improved.

Further, in a fifteenth aspect of the present invention, in the third aspect, a main body portion of a base member and the air bag door portion in the trim member for the automotive vehicle, which are integrally formed or separately formed are formed using the same resin in accordance with injection molding, the base member being covered by a skin having a tear portion, and a foam layer being formed between the skin and the base member.

Accordingly, even in the trim member for the automotive vehicle having a so-called integrally foamed type air bag door portion in which the base member is covered by the skin having a tear portion and the foamed layer is formed between the skin and the base member, by setting the resin fluidizing boundary at the core back area which is for forming the break portion when the air bag door portion is expanded the break force in the break portion can be lowered to a desired value, due to strength reduction which depends on the resin fluidizing boundary. Further, since it is not necessary to make the resin thickness of the break portion significantly thin, underfill during formation can be prevented, heat resistance and aging performance is improved, and support and surface rigidity of a whole of the air bag door portion can be also improved.

Further, in a sixteenth aspect of the present invention, in the third aspect, a cavity is separated in the tear portion by bringing a slide core having a distal end formed in a substantially triangular shape into contact with or in the proximity of a fixed mold, and in this state a resin is injected into each of the separated cavities, moving the slide core slightly backward at about the time filling is completed.

Accordingly, the resin fluidizing boundary can be set at the break portion when the air bag door portion is broken by a simple method of separating the cavity of the air bag door portion, injecting the resin into each of the cavities in this state and slightly moving backward the slide core under condition at about the time filling of the resin is completed, by means of the slide core having the distal end formed in a substantially triangular shape. As a result, since current molding equipment can be used, it is possible to manufacture at low cost. Further, since the method is simple, high reliability can be achieved in functional quality and high productivity can also be achieved.

Further, in a seventeenth aspect of the present invention, in the sixteenth aspect, wherein the break strength of the tear portion can be controlled with a combination of a keep pressure and a core back timing at about the time filling is completed and the thickness near the tear portion.

Accordingly, it is possible to easily and accurately control the break strength of the break portion to a desired value with a combination of the keep pressure before and after filling is completed, the core back timing and the thickness near the break portion.

Further, in an eighteenth aspect of the present invention, in the seventeenth aspect, the core back timing is set to after the filling is completed.

When the core back timing is too soon with respect to completion of filling, the resin filled first is fluidized within a space at the side wherein filling is not completed, so that the resin fluidizing boundary is shifted from the breakage expected portion which depends on the slide core. However, in contrast, in accordance with the present invention, since the core back timing is set to after filling is completed, in addition to the contents stated in claim 6, it is possible to prevent the resin fluidizing boundary and the breakage expected portion from shifting the positions thereof.

Further, in a nineteenth aspect of the present invention, in the eighteenth aspect, the keep pressure after the filling is completed is decreased, separating into several stages, and the core back timing is set to after a second stage of the keep pressure.

Accordingly, since the first stage of the keep pressure can be reliably performed by setting the core back timing to after the second stage of the keep pressure, the weight, size and shape of the formed product can be stabilized, so that generation of deficiencies in the product can be reduced.

Further, a twentieth aspect of the present invention comprises: a tear portion formed in the air bag door portion; and push-up means for pushing up a portion at both sides or one side of the air bag door portion having therebetween a center portion of the tear portion when a bag body of the air bag is expanded, wherein a resin fluidizing boundary is set at a core back area for forming the tear portion, and a line of the tear portion can not be seen from a side of an outer appearance.

Accordingly, the impact load from the bag body of the air bag is concentrated at the center portion of the tear portion when the bag body of the air bag is expanded, since the push-up means is provided. Further, since the resin fluidizing boundary is set at the core back area which is for forming the break portion when the air bag door portion is expanded, it is possible to decrease the break force of the break portion to a desired value, due to strength reduction which depends on the resin fluidizing boundary. As a result, it is possible to devise to reconcile expansion performance and the quality of the outer appearance (making invisible).

BRIEF DESCRIPTION OF THE DRAWINGS

FIG. 18A is a cross-sectional view which shows a skin formed by an attachment molding in the interior member for the automotive vehicle having the air bag door portion in accordance with the present invention.

FIG. 18B is a cross-sectional view which shows a skin formed by an attachment molding in the interior member for the automotive vehicle having the air bag door portion in accordance with the present invention.

FIG. 28 is a timing chart which shows a method of forming the trim member for the automotive vehicle integrally having the air bag door portion in accordance with the eighth embodiment of the present invention.

DESCRIPTION OF THE PREFERRED EMBODIMENTS

Figure 1:
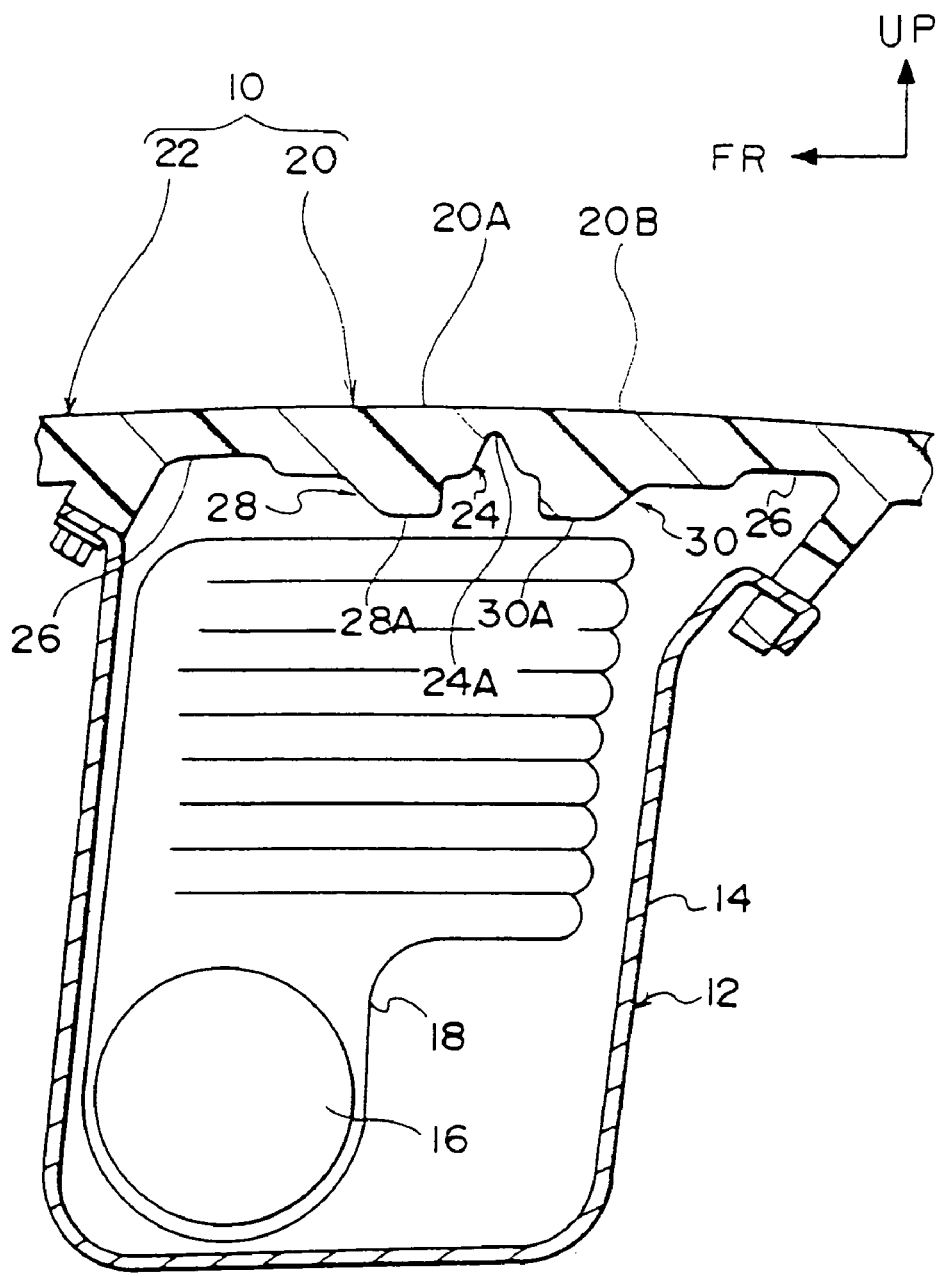
FIG. 1 is an enlarged cross-sectional view along a line 1—1 in FIG. 3.

A first embodiment of a interior member for an automotive vehicle having an air bag door portion in accordance with the present invention will be described below with reference to FIGS. 1 to 4.

Here, in the drawings, an arrow FR indicates a forward direction of an automotive vehicle, and an arrow UP indicates an upward direction an the automotive vehicle.

As shown in FIG. 1, in an instrument panel 10, which is a trim member for an automotive vehicle provided within a vehicle cabin of the automotive vehicle, an air bag apparatus 12 is arranged inside an assistant driver's seat. An air bag case 14 for this air bag apparatus 12 is fixed to an instrument panel reinforcement (not shown), and an inflator 16 and a air bag body 18 in a folded state is contained within the air bag case 14.

Further, a portion in a position substantially opposite to that of the air bag case 14 of the instrument panel 10 serves as an air bag door portion 20, and a portion other than the air bag door portion 20 of the instrument panel 10 serves as a main body portion 22. The air bag door portion 20 and the main body portion 22 are constituted of TSOP, which is a hard resin [obtained by making an elastomer (a rubber) and a PP (a polypropylene) Broy (a technique for making a high polymer multicomponent material of which can be expected a multiplier effect) and adding a talc so as to make it complex and strong, a PP that has a low specific gravity, impact resistance, rigidity and excellent fluidity, is suitable for a thin product, and has, for example, a rate of a flexural modulus of elasticity of 1500 to 3000 Mpa], a PP resin, PC/ABS resin, a denatured PPO resin, a PC/PBT resin, an ABS resin, a PC resin, an ASG resin, a TPO resin, a TPE resin, a TPU resin, a PC/denatured PS resin or the like.

The air bag apparatus 12 is structured such that when a sudden deceleration of the automotive vehicle is detected by a mechanical or electrical acceleration sensor (not shown), the inflator 16 within the air bag case 14 is operates so as to expand the air bag body 18, contained within the air bag case 14 in a folded state, toward the air bag door portion 20 of the instrument panel 10. The air bag body 18 is structured such as to press the air bag door portion 20 in the instrument panel 10 so as to break and open the air bag door portion 20, thereby expanding within the vehicle cabin. In this case, since a conventionally known popular structure can be applied to the air bag apparatus 12, detailed descriptions of the air bag apparatus 12 will be omitted in this embodiment.

Figure 3:
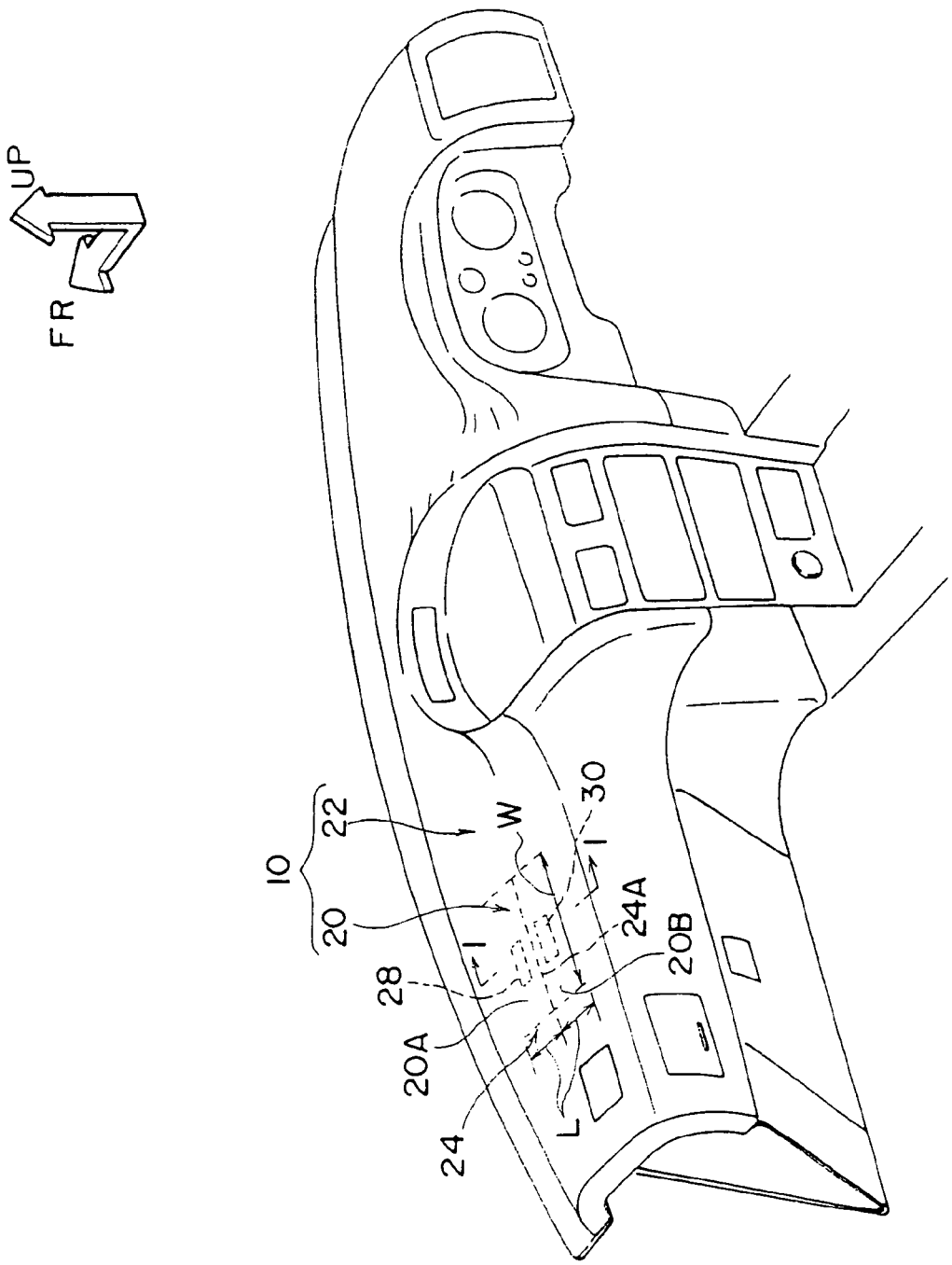
FIG. 3 is a perspective view as seen from behind and at an angle with respect to the automotive vehicle which shows an instrument panel as the trim member for the automotive vehicle having the air bag door portion in accordance with the first embodiment of the present invention.

As shown in FIG. 3, a tear portion 24 which was made thin is formed in a center portion in a longitudinal direction and both end portions in a lateral direction of the air bag door portion 20 so as to be formed in an H shape, and it is structured such that the air bag door portion 20 is opened toward both directions in a longitudinal direction when the bag body of the air bag is expanded, so that the bag body of the air bag is expanded within the vehicle cabin.

Figure 2:
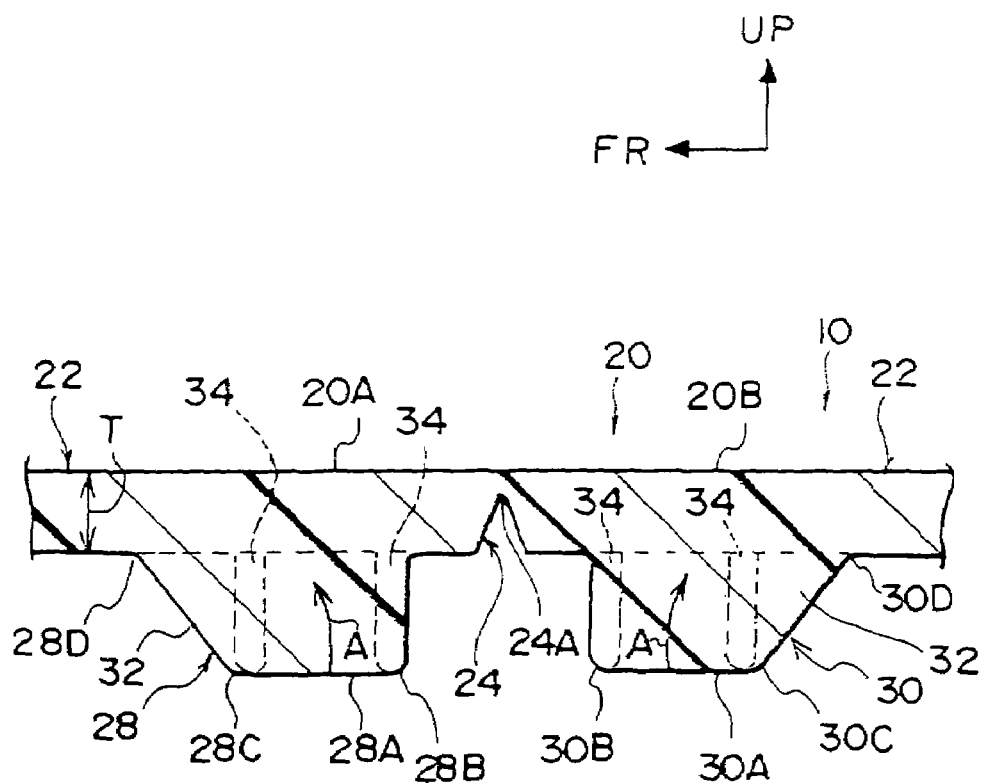
FIG. 2 is an enlarged side sectional view which shows main portions of an interior member for an automotive vehicle having an air bag door portion in accordance with a first embodiment of the present invention.

As shown in FIG. 2, a cross section of the tear portion 24 of the air bag door portion 20 is formed in a V shape. Further, in the air bag door portion 20, protrusions 28 and 30 serving as push-up means is provided at positions at two sides in a longitudinal direction of the automotive vehicle having therebetween a center portion 24A of the tear portion 24 so as to protrude downward, and the protrusions 28 and 30 are integrally formed with the air bag door portion 20. Accordingly, it is structured such that when the bag body of the air bag is expanded, the expanding bag body of the air bag abuts lower surfaces 28A and 30A of the protrusions 28 and 30, thereby pressing the protrusions 28 and 30 upward (in a direction of an arrow A in FIG. 2).

Figure 4:
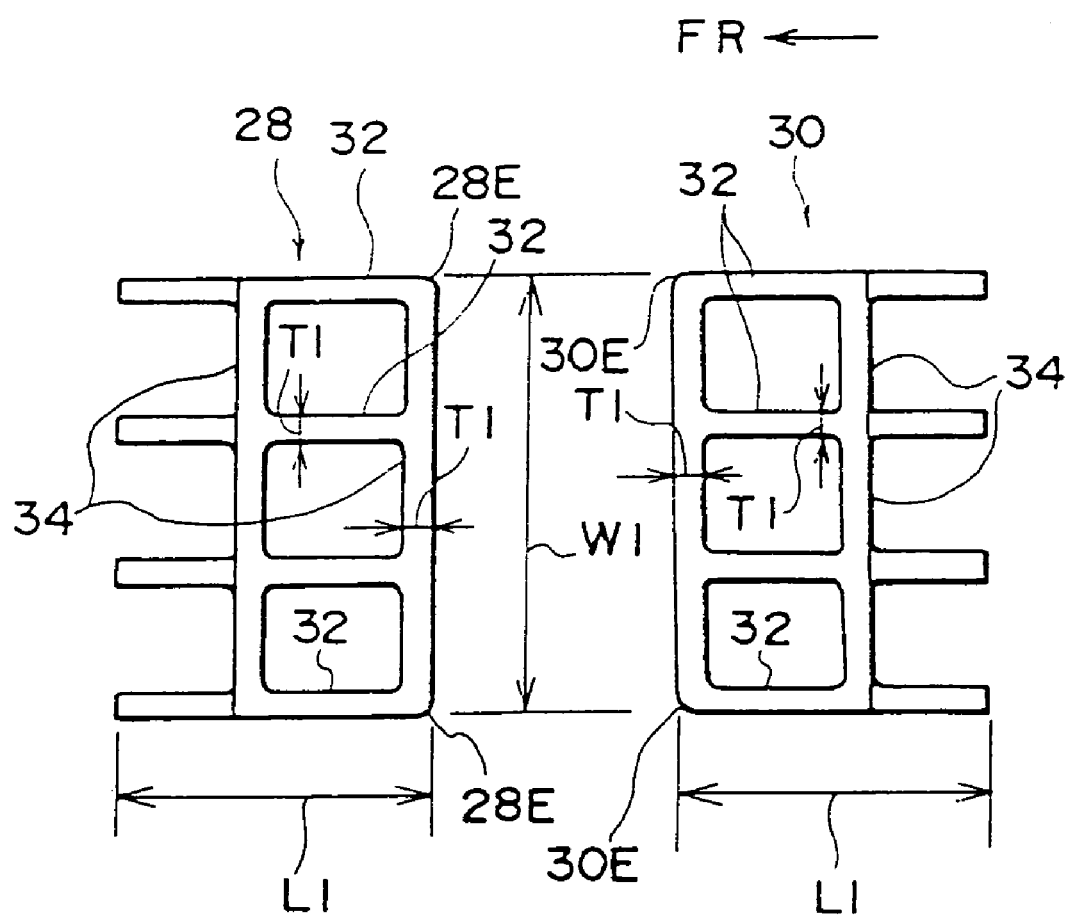
FIG. 4 is an enlarged plan view which shows a portion of the trim member for the automotive vehicle having the air bag door portion in accordance with the first embodiment of the present invention.

As shown in FIG. 4, the protrusions 28 and 30 are formed in a lattice form by a narrow rib 32 extending in a longitudinal direction of the automotive vehicle and a narrow rib 34 extending in a lateral direction of the automotive vehicle. A width T1 of these ribs 32 and 34 is set to be equal to or less than half a thickness T of the air bag door portion 20 shown in FIG. 2, so that shrinkage is prevented.

Further, a width W1 and a length L1 of the protrusions 28 and 30 are respectively set to be about 5 to 20% a total width W and a total length L of a front door portion 20A and a rear door portion 20B of the air bag door portion 20 shown in FIG. 3. Accordingly, the air bag door portion 20 is structured such that deflections in the lateral direction and the longitudinal direction are not significantly hampered by the protrusions 28 and 30, and the air bag door portion 20 is deflected in the lateral direction and the longitudinal direction when the bag body of the air bag is expanded, thereby being securely broken from the center portion 24A of the tear portion 24.

In this case, as shown in FIG. 1, a hinge portion 26 which has been made thin is formed at both end portions in the longitudinal direction of the air bag door portion 20. Accordingly, the air bag door portion 20 is structured such that when it is pressed by the expanding air bag body 18 when the air bag is expanded, it is opened and broken along the tear portion 24, so that the opened and broken front door portion 20A and rear door portion 20B rotate around the hinge portions 26 and an opening for expanding the air bag body 18 within the vehicle cabin is formed.

In this case, as shown in FIGS. 2 and 4, each of corner portions 28B, 30B, 28C, 30C, 28D, 30D, 29E and 30E of the protrusions 28 and 30 abutting the air bag body 18 when the bag body of the air bag is expanded, is beveled, thereby protecting the air bag body 18.

Next, an operation of the first embodiment in accordance with the present invention will be described below.

In this first embodiment, when the bag body of the air bag is expanded, the expanding air bag body abuts the lower surfaces 28A and 30A of the protrusions 28 and 30, thereby pressing the protrusions 28 and 30 upward (the direction of the arrow A in FIG. 2). Accordingly, an impact load acts on the protrusions 28 and 30 from the air bag body 18 momentarily, and breakage is smoothly performed from the center portion 24A of the tear portion 24. As a result, since the tear portion 24 can be easily broken even when the thickness thereof is large, it is possible to devise to reconcile expansion performance and the quality of the outer appearance (making invisible).

Further, a load on the hinge portions 26 can be lightened. Still further, since the air bag door portion 20 can be constituted of a hard material having a high rigidity, an oil-can-like-feeling and deformation can be prevented. Furthermore, it is possible to devise to reconcile the quality of the outer appearance and expansion performance through a simple structure in which the protrusions 28 and 30 are merely provided in the air bag door portion 20.

Still further, since the protrusions 28 and 30 are formed by the ribs 32 and 34 integrally formed with the air bag door portion 20, the protrusions 28 and 30 can be formed without mounting a separate part, and since the width (T1) between the ribs 32 and 34 is narrower than the thickness (T) of the normal portion of the air bag door portion 20 (T1≦T/2), generation of shrinkage on the surface of the air bag door portion 20 caused by the ribs 32 and 34 after injection molding can be restricted, so that the quality of the outer appearance is not deteriorated.

Figure 5:
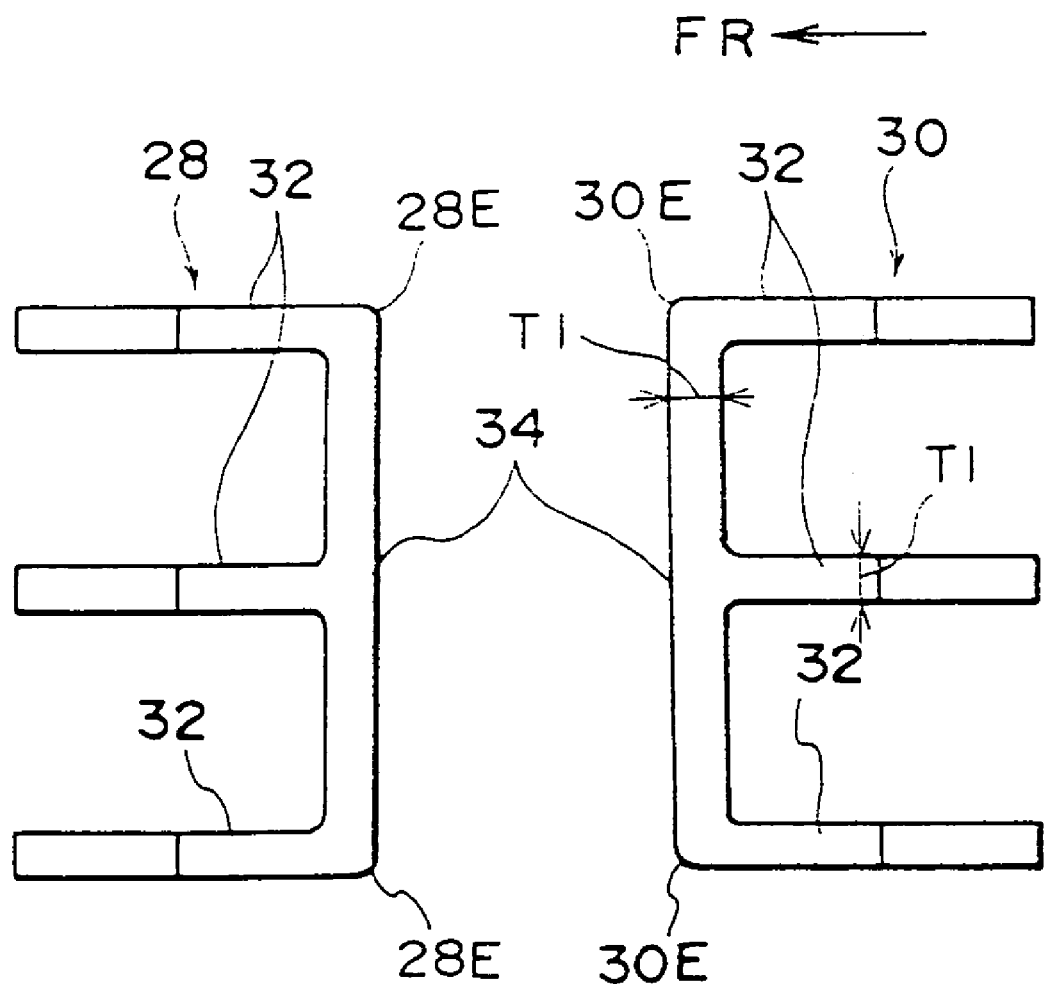
FIG. 5 is an enlarged plan view which shows a portion of an interior member for an automotive vehicle having an air bag door portion in accordance with a modified embodiment of the first embodiment of the present invention.

In this case, in accordance with the first embodiment, as shown in FIG. 4, the protrusions 28 and 30 are formed in a lattice form by the narrow rib 32 extending in the longitudinal direction and the narrow rib 34 extending in the lateral direction; however, the shape of the protrusions 28 and 30 is not limited to this, for example, another shape such as an E shape or the like may be employed as shown in FIG. 5.

Figure 6A:
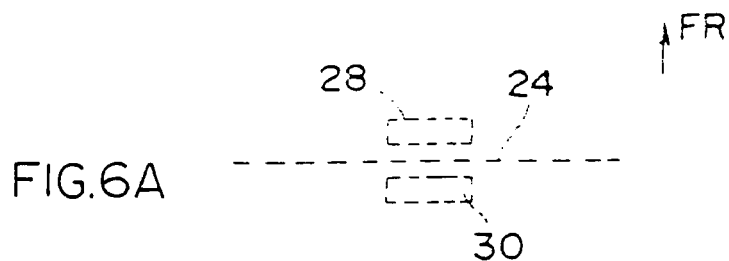
FIG. 6A is a schematic plan view which shows a positional relation between the portion and the tear portion in the trim member for the automotive vehicle having the air bag door portion in accordance with the modified embodiment of the first embodiment of the present invention.
Figure 6B:
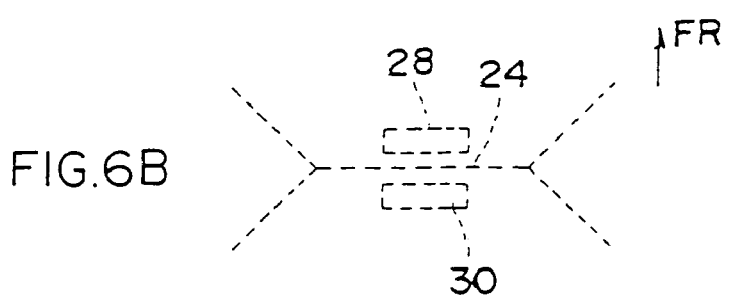
FIG. 6B is a schematic plan view which shows a positional relation between the portion and the tear portion in the trim member for the automotive vehicle having the air bag door portion in accordance with the modified embodiment of the first embodiment of the present invention.
Figure 6C:
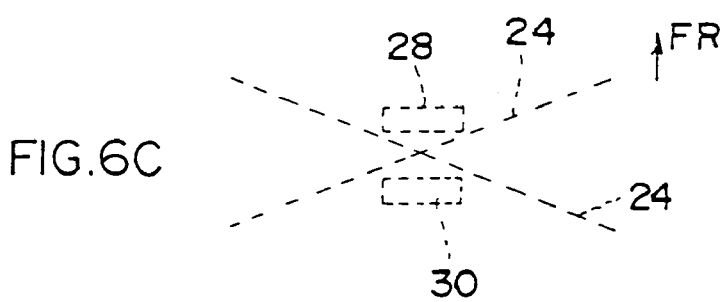
FIG. 6C is a schematic plan view which shows a positional relation between the portion and the tear portion in the trim member for the automotive vehicle having the air bag door portion in accordance with the modified embodiment of the first embodiment of the present invention.
Figure 6D:
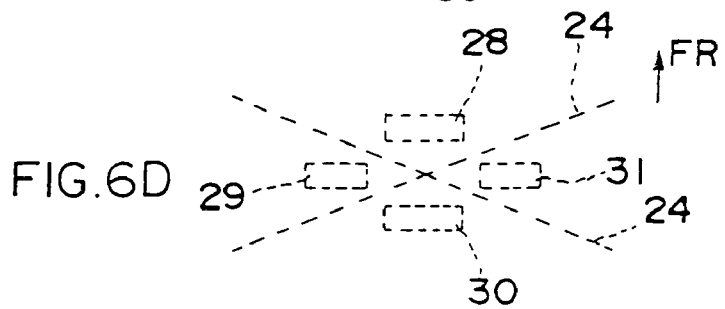
FIG. 6D is a schematic plan view which shows a positional relation between the portion and the tear portion in the trim member for the automotive vehicle having the air bag door portion in accordance with the modified embodiment of the first embodiment of the present invention.
Figure 6E:
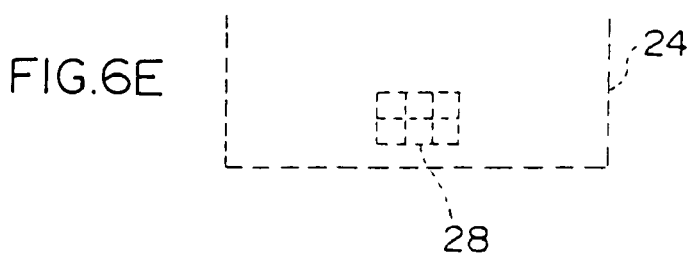
FIG. 6E is a schematic plan view which shows a positional relation between the portion and the tear portion in the trim member for the automotive vehicle having the air bag door portion in accordance with the modified embodiment of the first embodiment of the present invention.

Further, in accordance with the first embodiment, as shown in FIG. 3, the tear portion 24 is formed in an H shape in a plan view, however, the shape of the tear portion 24 is not limited to this, for example, a linear shape as shown in FIG. 6A, a double-Y shape as shown in FIG. 6B, an X shape as shown in FIG. 6C and the like may be employed. Still further, as shown in FIG. 6D, in a case wherein the tear portion 24 is formed in an X shape, the portions 29 and 31 may be formed by closing in the tear portion 24 in the lateral direction as well. Furthermore, as shown in FIG. 6E, in a case wherein the tear portion 24 is formed in a C shape, it is possible to form only the portion 28, at one side of the tear portion 24.

Next, a second embodiment of a interior member for an automotive vehicle having an air bag door portion will be described below with reference to FIGS. 7 to 9.

In this case, the same reference numerals are attached to the same elements as those in the first embodiment, and an explanation thereof will be omitted.

Figure 7:
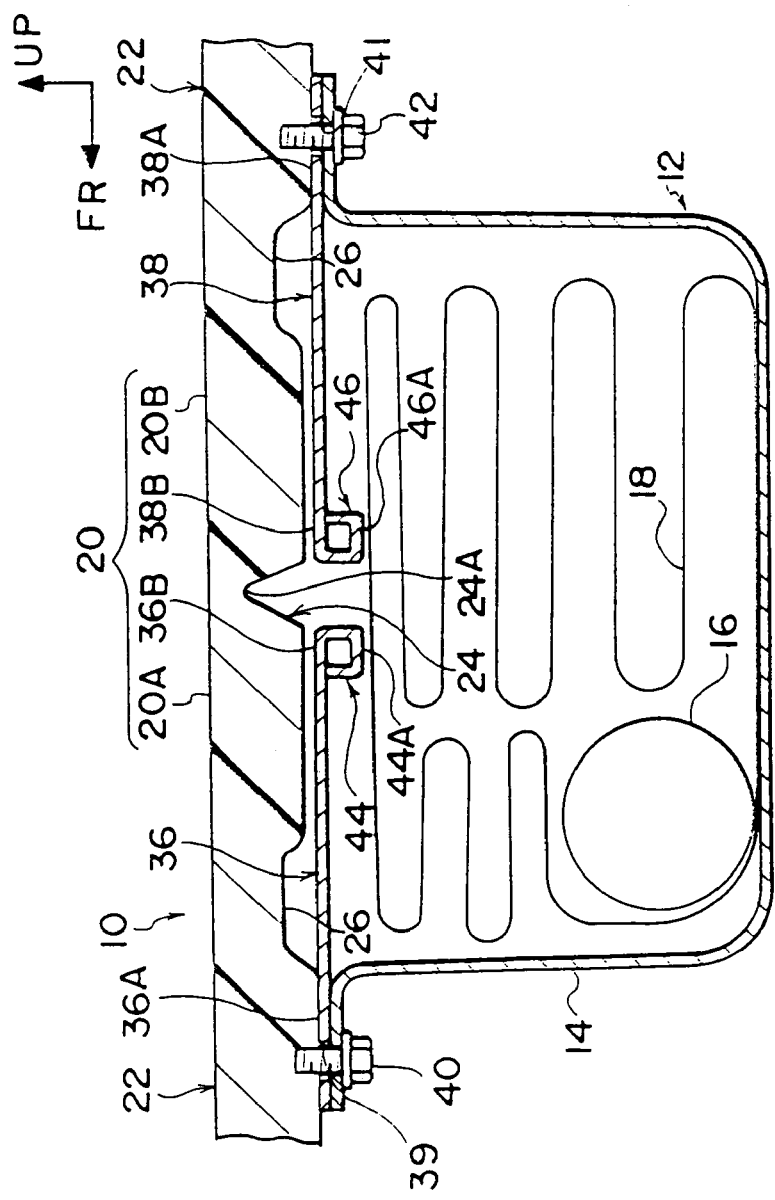
FIG. 7 is a side sectional view corresponding to FIG. 1, showing an interior member for an automotive vehicle having an air bag door portion in accordance with a second embodiment of the present invention.

As shown in FIG. 7, in this second embodiment, metal plates 36 and 38 made of a metal, for example, aluminum, iron, stainless steel or the like, are respectively disposed below the front door portion 20A and the rear door portion 20B of the air bag door portion 20. A front end portion 36A of the metal plate 36 is fastened to both the air bag case 14 and the main body portion 22 of the instrument panel 10 by a bolt 40 passing through a mounting hole 39 punched into the metal plate 36. A rear end portion 38A of the metal plate 38 is fastened to both the air bag case 14 and the main body portion 22 of the instrument panel 10 by a bolt 42 passing through a mounting hole 41 punched into the metal plate 38. Further, a rear distal end portion 36B of the metal plate 36 and a front distal end portion 38B of the metal plate 38 are respectively bent downward to have a rectangular cross section so as to be portions 44 and 46 as push-up means, and these portions 44 and 46 are respectively structured such as to abut portions at both sides in the lateral direction of the air bag door portion 20 having therebetween the center portion 24A of the tear portion 24 when the bag body of the air bag is expanded.

Figure 9:
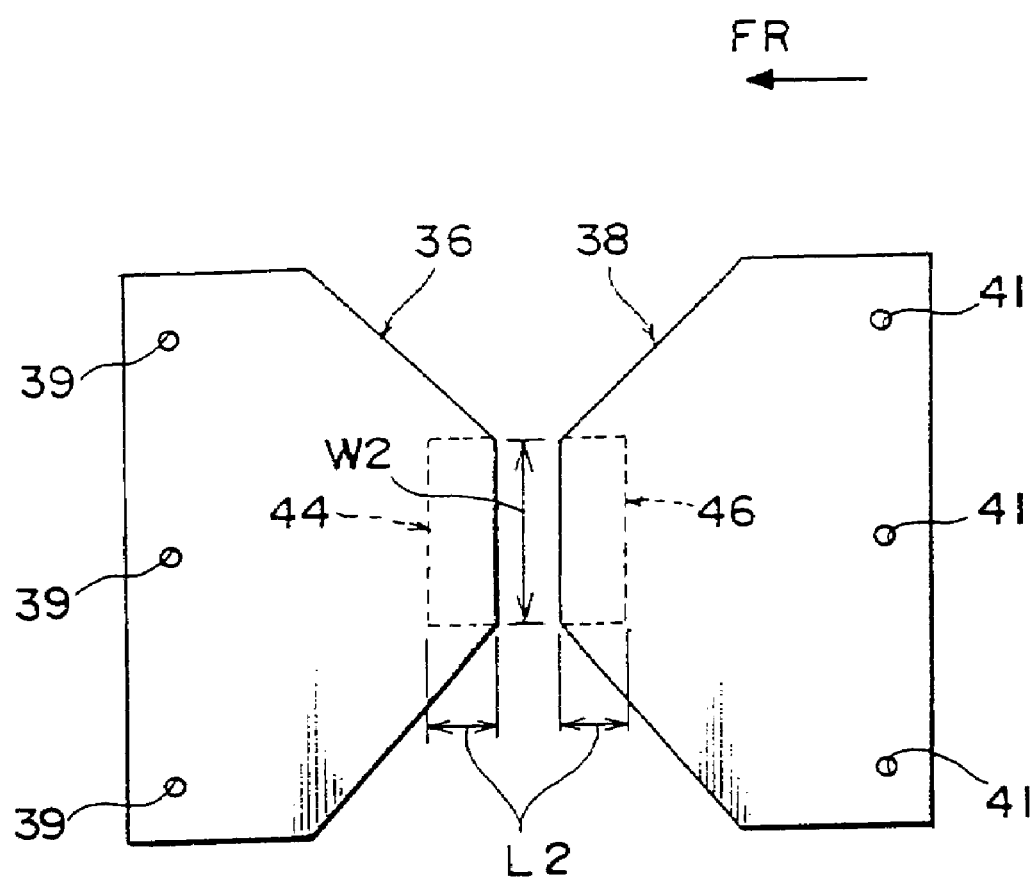
FIG. 9 is a plan view which shows a metal plate of the trim member for the automotive vehicle having the air bag door portion in accordance with the second embodiment of the present invention.

As shown in FIG. 9, the metal plate 36 is formed in a trapezoidal shape in which a rear portion is narrow in a plan view, and the metal plate 38 is formed in a trapezoidal shape in which a front portion is narrow. Further, a width W2 and a length L2 of the portions 44 and 46 are respectively set to be about 5 to 20% the total width W and the total length L of the front door portion 20A and the rear door portion 20B in the air bag door portion 20 shown in FIG. 3. Accordingly, the air bag door portion 20 is structured such that deflections in the lateral direction and the longitudinal direction are not significantly hampered by the protrusions 28 and 30, and the air bag door portion 20 is deflected in the lateral direction and the longitudinal direction when the bag body of the air bag is expanded, thereby being securely broken from the center portion 24A of the tear portion 24.

Next, an operation of the second embodiment in accordance with the present invention will be described below.

Figure 8:
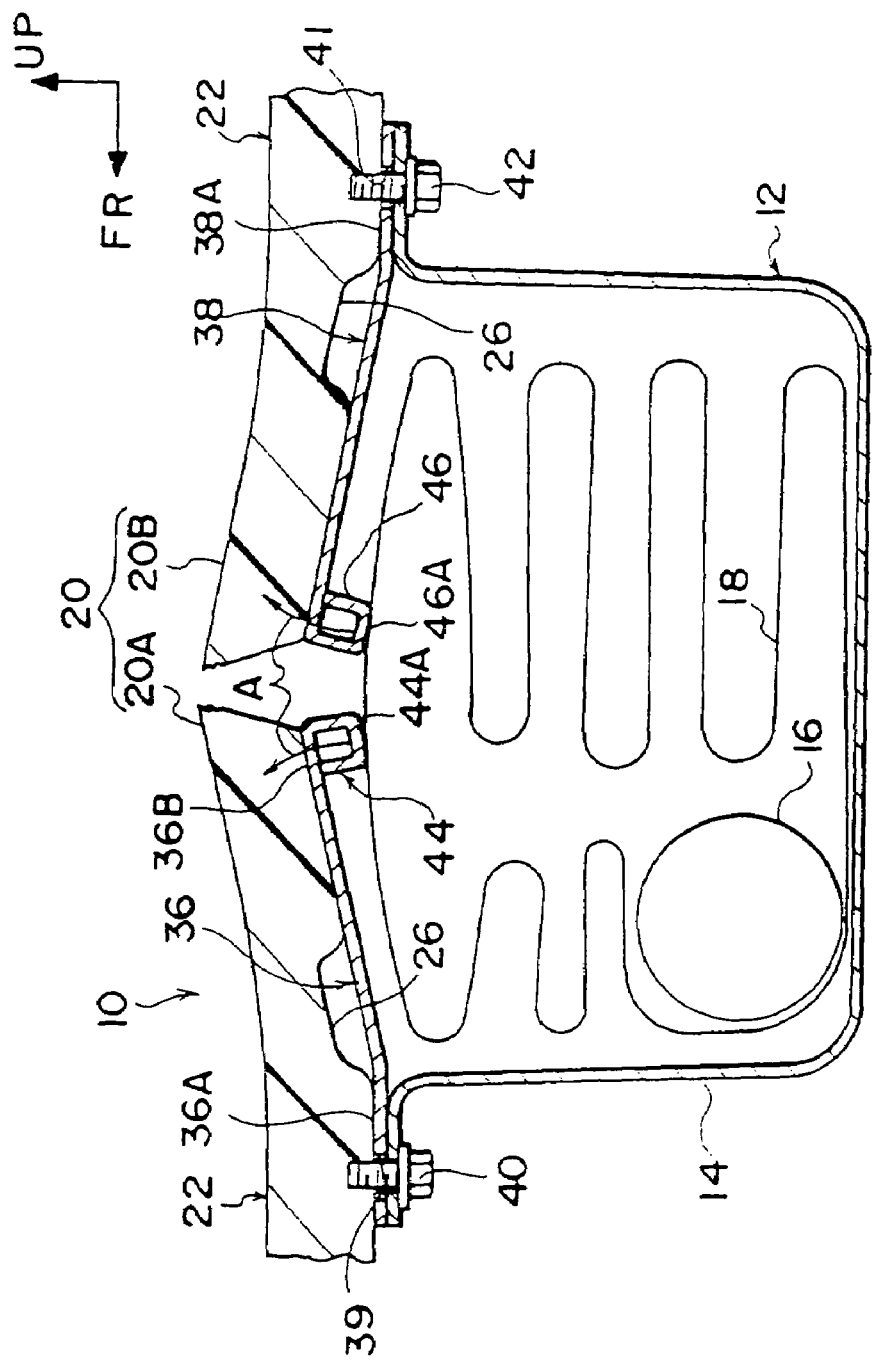
FIG. 8 is a view for explaining an operation, which shows the trim member for the automotive vehicle having the air bag door portion in accordance with the second embodiment of the present invention.

In this second embodiment, during expansion of the air bag body 18, the expanding bag body of the air bag abuts the lower surfaces 44A and 46A of the portions 44 and 46 in the metal plates 36 and 38, as shown in FIG. 8, thereby pressing the portions 44 and 46 upward (a direction of an arrow A in FIG. 8). Accordingly, an impact load from the air bag body 18 momentarily acts on both sides in the lateral direction of the center portion 24A of the tear portion 24 in the air bag door portion 20 via the portions 44 and 46. Accordingly, the air bag door portion 20 is smoothly broken from the center portion 24A of the tear portion 24. As a result, since the tear portion 24 can be easily broken even when the thickness thereof is large, it is possible to devise to reconcile the expansion performance and the quality of the outer appearance (making invisible).

Figure 10:
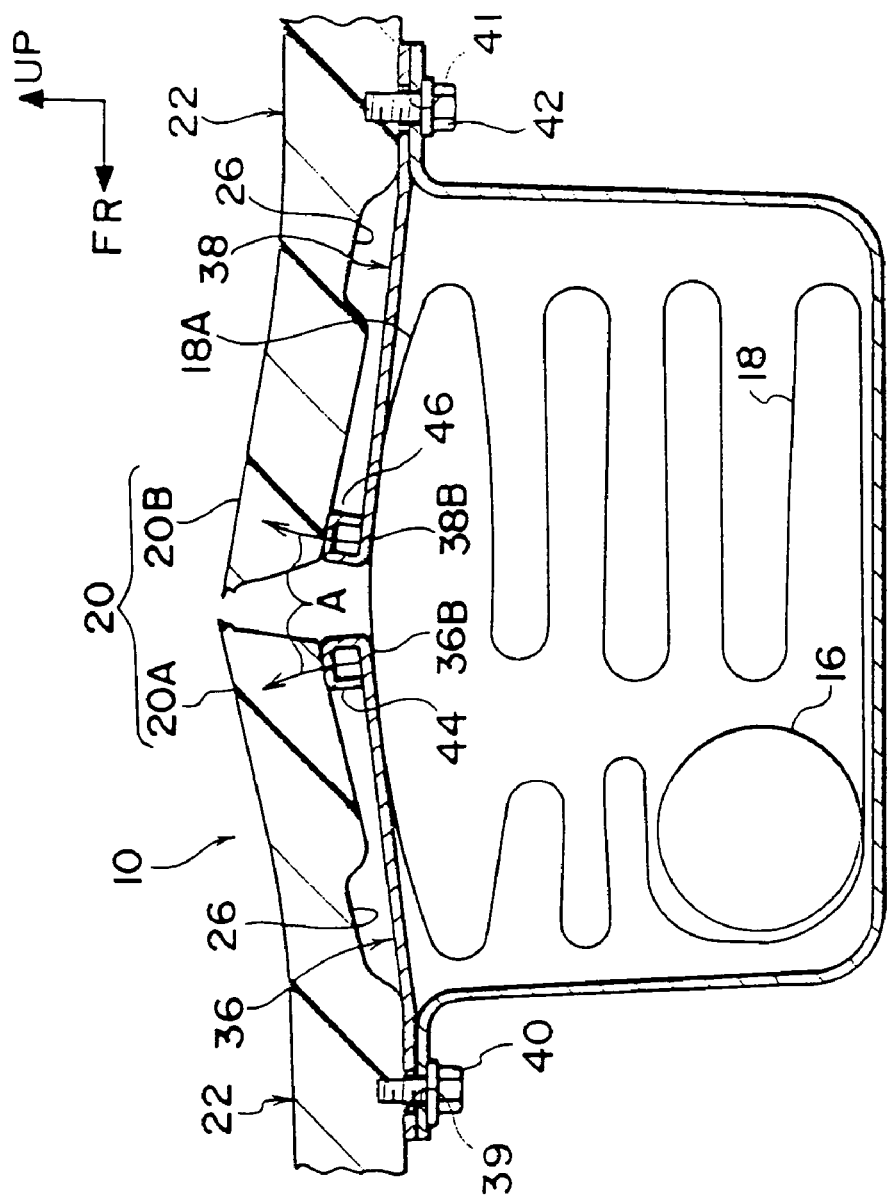
FIG. 10 is a side sectional view corresponding to FIG. 8, showing an interior member for an automotive vehicle having an air bag door portion in accordance with a modified embodiment of the second embodiment of the present invention.
Figure 11:
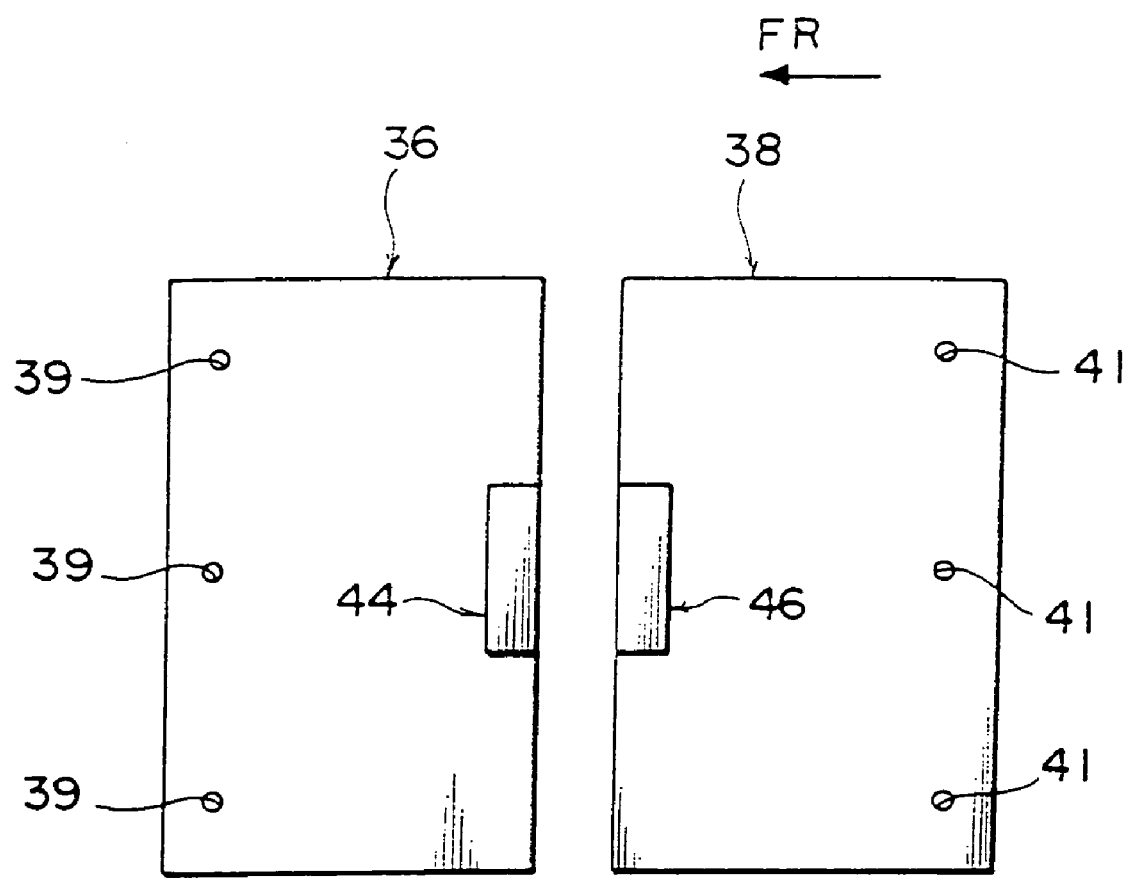
FIG. 11 is a plan view which shows a metal plate of the trim member for the automotive vehicle having the air bag door portion in accordance with the modified embodiment of the second embodiment of the present invention.

Further, in the second embodiment, the portions 44 and 46 are formed at the lower side of the metal plates 36 and 38, that is, at the side of the air bag body 18; however, alternatively, as shown in FIG. 10, the portions 44 and 46 may be formed at the side of the upper surface of the metal plates 36 and 38, that is, at the side of the air bag door portion 20. In this case, by providing the portions 44 and 46 at the upper surface of the distal ends 36B and 38B of the metal plates 36 and 38, as shown in FIG. 10, even when the upper surface 18A of the air bag body 18 becomes an uneven shape during an initial period of expansion, the air bag body 18 reliably abuts each of the lower surfaces of the flat metal plates 36 and 38 so as to push up the portions 44 and 46 in the direction of the arrow A, so that it is possible to securely break from the center portion 24A of the tear portion 24. Further, as shown in FIG. 11, in a case of forming the portions 44 and 46 at the side of the upper surface of the metal plates 36 and 38, that is, at the side of the air bag door portion 20, even when the shape in a plan view of the metal plates 36 and 38 is rectangular, the portions 44 and 46 can reliably abut the portions at both sides in the longitudinal direction of the automotive vehicle having therebetween the center portion of the tear portion in the air bag door portion. Further, in accordance with the second embodiment, hinge portions are not particularly formed in the metal plates 36 and 38; however, at positions substantially opposite to that of the hinge portions 26 of the air bag door portion 20, the metal plates 36 and 38 may be bent upward or downward in U-shaped forms, thereby having them serve as hinge portions.

Next, a third embodiment of a interior member for an automotive vehicle having an air bag door portion will be described below with reference to FIGS. 12 and 13.

In this case, the same reference numerals are attached to the same elements as those in the first embodiment, and an explanation thereof will be omitted.

Figure 12:
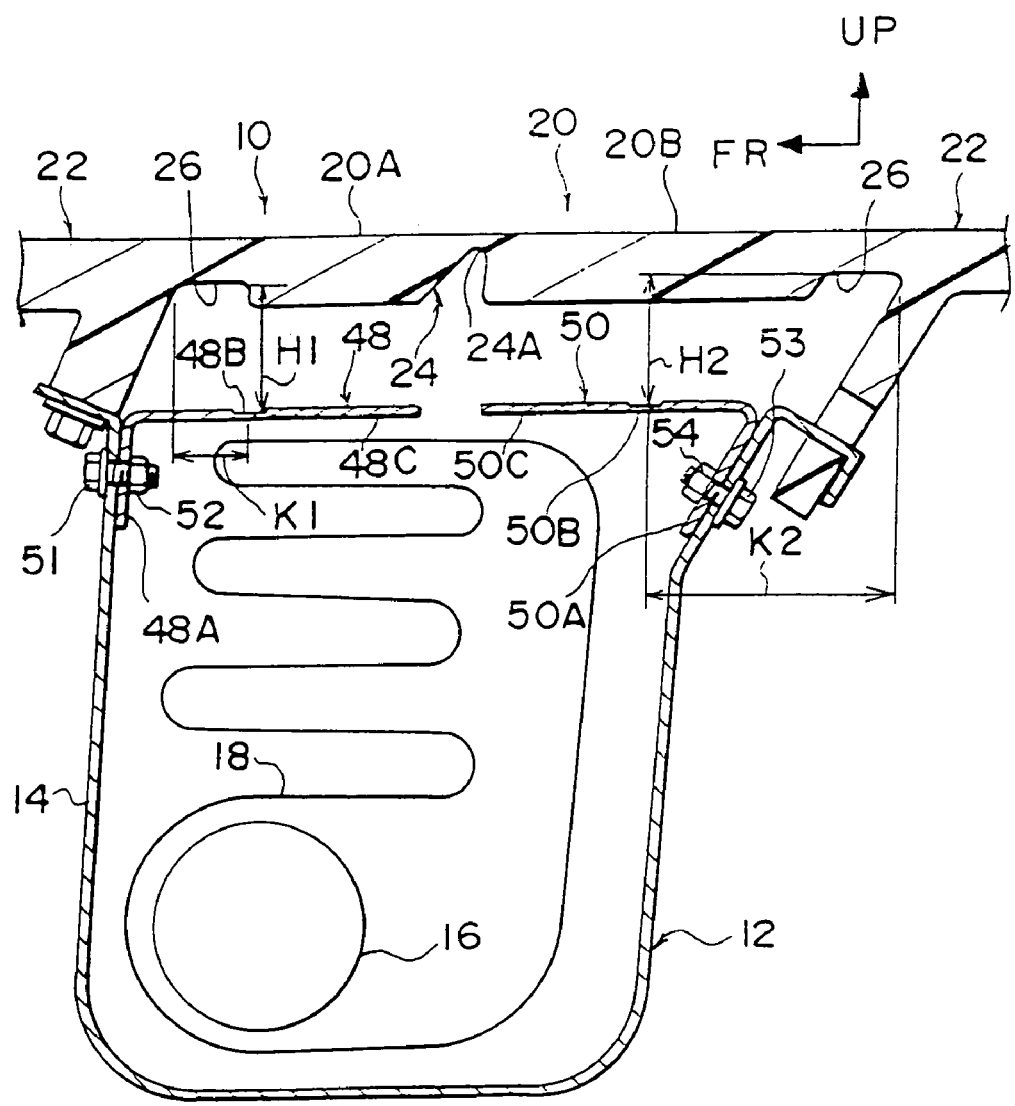
FIG. 12 is a side sectional view corresponding to FIG. 1, which shows an interior member for an automotive vehicle having an air bag door portion in accordance with a third embodiment of the present invention.

As shown in FIG. 12, in this third embodiment, metal plates 48 and 50 made of a metal, for example, aluminum, iron, stainless steel or the like are respectively disposed below the front door portion 20A and the rear door portion 20B of the air bag door portion 20. A front end portion 48A of the metal plate 48 is fixed to the air bag case 14 by a bolt 51 and a nut 52 and a rear end portion 50A of the metal plate 50 is fixed to the air bag case 14 by a bolt 53 and a nut 54. Further, hinge portions 48B and 50B of the metal plates 48 and 50 are made thin. The hinge portions 48B and 50B are off set below the hinge portions 26 of the air bag door portion 20 (with off-set amounts H1 and H2) and off set with respect to the center portion 24A of the tear portion 24 (with off-sets amounts K1 and K2). Further, portions between the hinge portions 48B and 50B and the front end portion 48A and the rear end portion 50A respectively which serve as a mounting portion thereof, and portions between the hinge portions 48B and 50B and the front end portions 48C and 50C respectively have a rigidity higher than that of the hinge portions 48B and 50B. Namely, only the hinge portions 48B and 50B are made thin and have low rigidity.

Next, an operation of the third embodiment will be described below.

Figure 13:
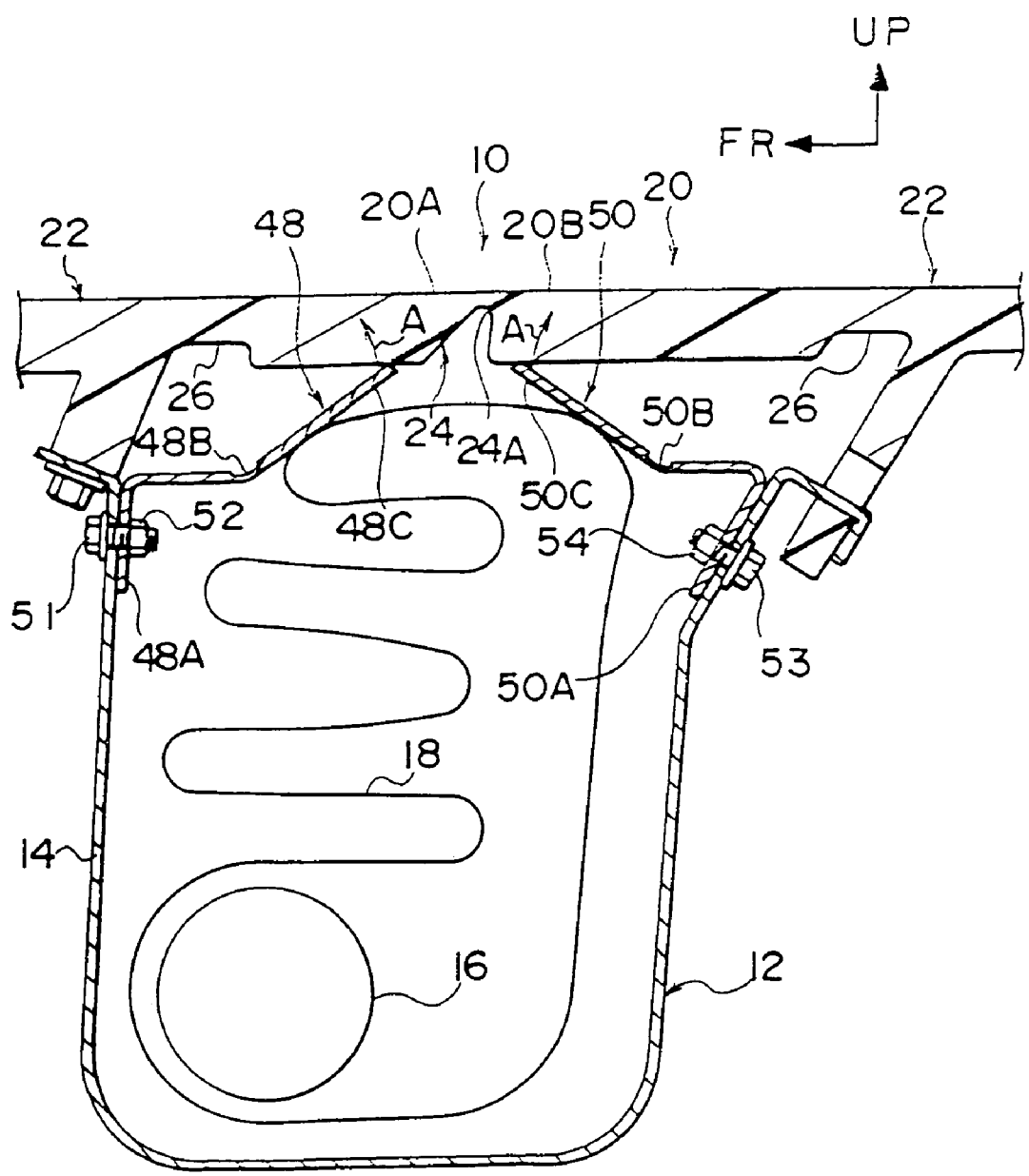
FIG. 13 is a view for explaining an operation, which shows the trim member for the automotive vehicle having the air bag door portion in accordance with the third embodiment of the present invention.

In this third embodiment, the air bag body 18 expand when the bag body of the air bag is expanded abuts the lower surfaces of the metal plates 48 and 50, as shown in FIG. 13, thereby pressing the front end portions 48C and 50C of the metal plates 48 and 50 upward (the direction of the arrow A in FIG. 13). Accordingly, since an impact load from the air bag body 18 momentarily acts on both sides in the lateral direction of the center portion 24A of the tear portion 24 in the air bag door portion 20 via the front end portions 48C and 50C of the metal plates 48 and 50 having a high rigidity, the air bag door portion 20 is smoothly broken from the center portion 24A of the tear portion 24. As a result, since the tear portion 24 can be easily broken even when the thickness thereof is large, it is possible to devise to reconcile the expansion performance and the quality of the outer appearance (making invisible).

Further, since the hinge portions 48B and 50B of the metal plates 48 and 50 are off set with respect to the center portion 24A of the tear portion 24 more than the hinge portion 26 of the air bag door portion 20, and the portion between the hinge portions 48B and 50B respectively of the metal plates 48 and 50 and the front end portions 48A and rear end portion 50A serving as the mounting portions are made highly rigid, it is possible to prevent the air bag body 18 from directly abutting the hinge portions 26 of the air bag door portion 20 due to the portions between the hinge portions 48B and 50B respectively of the metal plates 48 and 50 and the front end portion 48A and the rear end portion 50A respectively, when the bag body of the air bag is expanded, so that it is possible to prevent the hinge portions 26 of the air bag door portion 20 from breaking such as cracking due to the air bag body 18.

Figure 14:
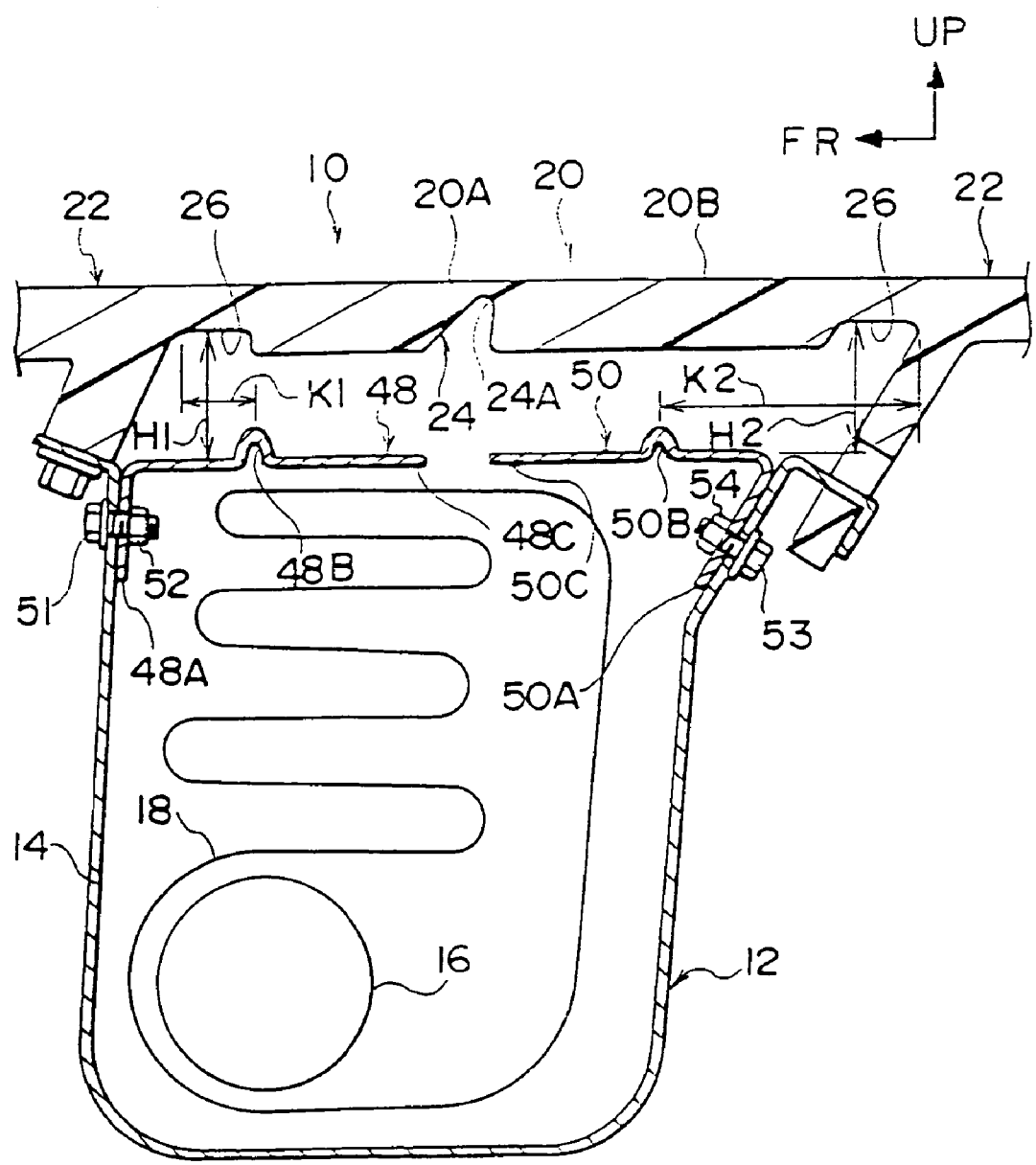
FIG. 14 is a side sectional view corresponding to FIG. 1, showing an interior member for an automotive vehicle having the air bag door portion in accordance with a modified embodiment of the third embodiment of the present invention.

Further, in the third embodiment, the hinge portions 48B and 50B of the metal plates 48 and 50 are made thin; however, in place of this, as shown in FIG. 14, the hinge portions 48B and 50B may be made as another structure wherein the metal plates 48 and 50 are bent upward in a U-shaped form, or the like.

Next, a fourth embodiment of a interior member for an automotive vehicle having an air bag door portion will be described below with reference to FIG. 15.

In this case, the same reference numerals are attached to the same elements as those in the third embodiment, and an explanation thereof will be omitted.

Figure 15:
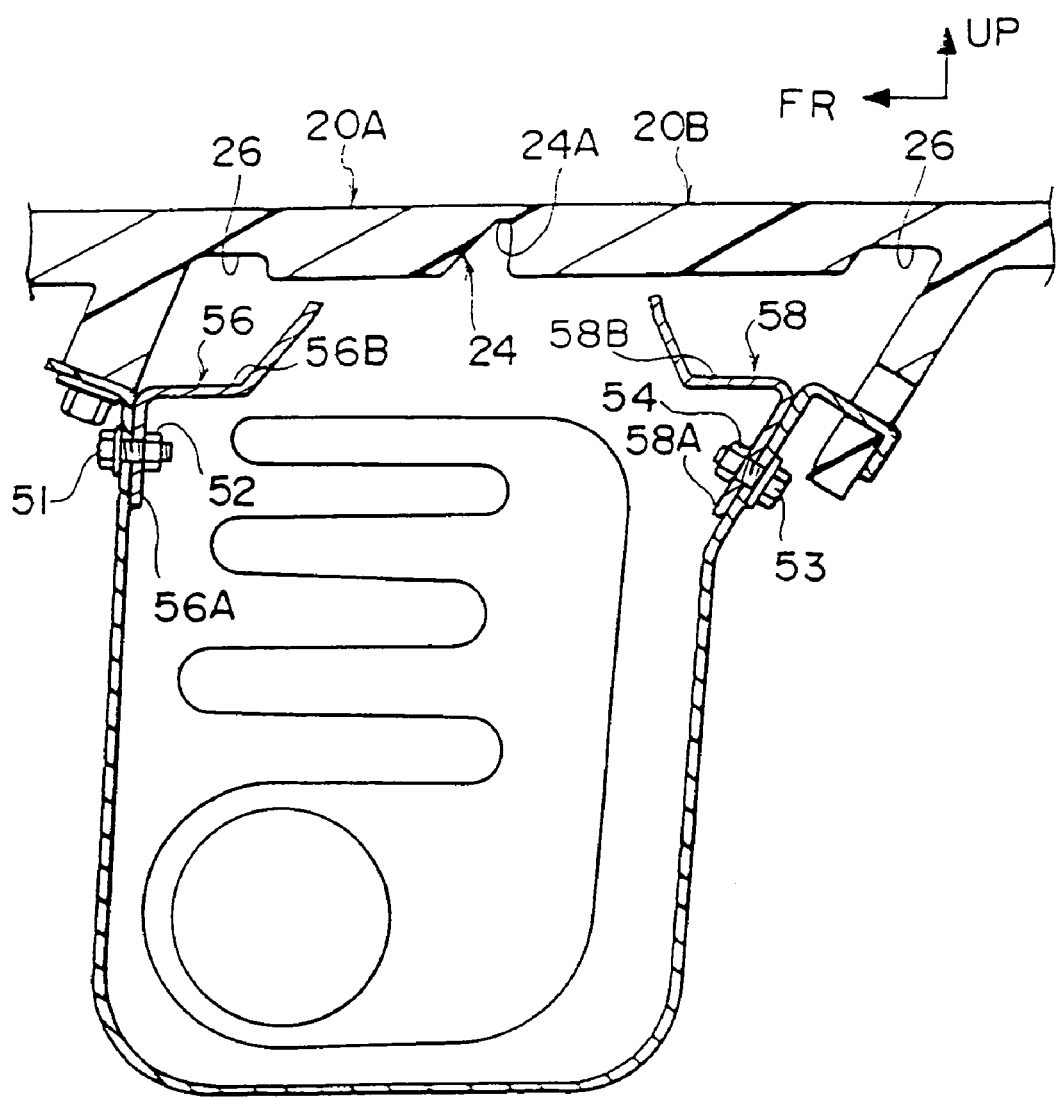
FIG. 15 is a side sectional view corresponding to FIG. 1, showing an interior member for an automotive vehicle having an air bag door portion in accordance with a fourth embodiment of the present invention.

As shown in FIG. 15, in this fourth embodiment, door hinge portion protecting plates 56 and 58 having a high break force and made of a metal, for example, aluminum, iron, stainless steel or the like, are respectively disposed below the front door portion 20A and the rear door portion 20B of the air bag door portion 20. A front portion 56A of the door hinge portion protecting plate 56 is fixed to the air bag case 14 by the bolt 51 and the nut 52, and a rear portion 58A of the door hinge portion protecting plate 58 is fixed to the air bag case 14 by the bolt 53 and the nut 54. Further, a rear portion 56B of the door hinge portion protecting plate 56 and a front portion 58B of the door hinge portion protecting plate 58 respectively protrude toward the center portion 24A of the tear portion 24 rather than toward the hinge portions 26 of the air bag door portion 20, and further are extended to a position near the reverse face of the air bag door portion 20. In this case, each of the extending portions of the rear portion 56B of the door hinge portion protecting plate 56 and the front portion 58B of the door hinge portion protecting portion 58 is structured such as to be plastically deformed to a certain degree due to by the impact load from the air bag body 18.

Next, an operation of the fourth embodiment will be described below.

In this fourth embodiment, since the rear portion 56B and the front portion 58B of the door hinge portion protecting plates 56 and 58 respectively protrude toward the center portion 24A of the tear portion 24 rather than toward the hinge portions 26 of the air bag door portion 20, and further, are extended to a position near the reverse face of the air bag door portion 20, it is possible to prevent the air bag body 18 from directly abutting the hinge portions 26 of the air bag door portion 20 when the bag body of the air bag is expanded, so that it is possible to prevent the hinge portions 26 from breaking due to the air bag body 18. Further, since the hinge portions 26 of the air bag door portion 20 can be protected, it is easy to break from the center portion 24A of the tear portion 14, which has a relatively low strength.

Next, a fifth embodiment of a interior member for an automotive vehicle having an air bag door portion will be described below with reference to FIG. 16.

In this case, the same reference numerals are attached to the same elements as those in the first embodiment, and an explanation thereof will be omitted.

Figure 16:
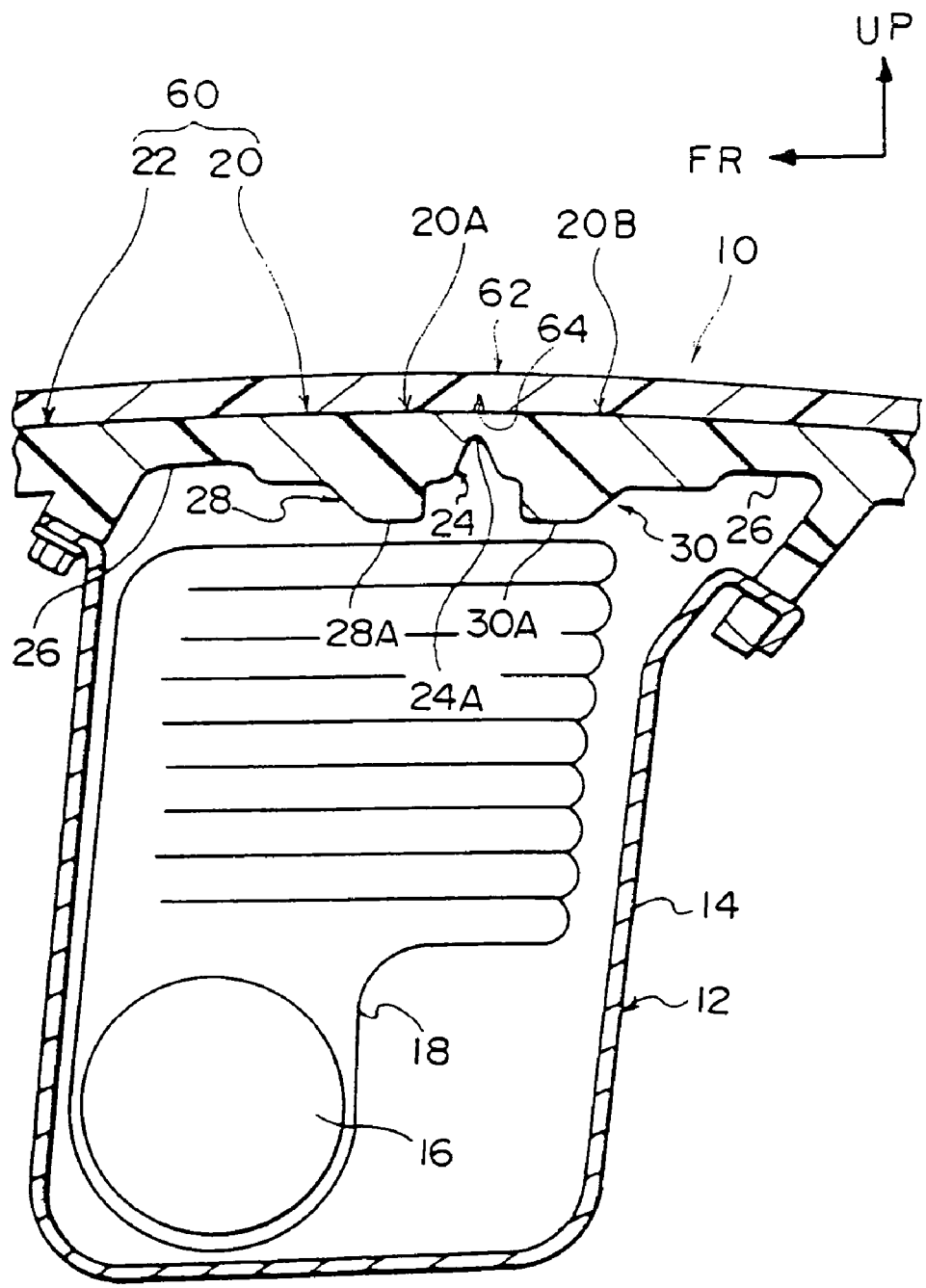
FIG. 16 is a side sectional view corresponding to FIG. 1, showing an interior member for an automotive vehicle having an air bag door portion in accordance with a fifth embodiment of the present invention.

As shown in FIG. 16, in the fifth embodiment, the air bag door portion 20, as the base member of the air bag door portion, and the main body portion 22, as the base member of the main body portion, are integrally formed of the same hard resin material, and a skin 62, for example, made of PVC, TPO, fabric or the like, is disposed on an obverse face (an outer appearance) of the integrally formed base member 60 in accordance with an insert molding or an attachment molding. Further, a tear portion 64 which has been made thin, for example, is formed on the reverse face (the base material) side of the skin 62 or on the obverse face side thereof along the tear portion 24 of the base member, and the skin 62 covers the obverse face (the outer appearance) of the base member 60.

Next, an operation of the fifth embodiment will be described below.

In this fifth embodiment, when the bag body of the air bag is expanded the air bag body 18 abuts the lower surfaces 28A and 30A of the protrusions 28 and 30, thereby pressing the protrusions 28 and 30 upward. Accordingly, an impact load acts on the protrusions 28 and 30 from the air bag body 18, breakage is smoothly performed from the center portion 24A of the tear portion 24, and the skin 62 smoothly breaks from the tear portion 60 as well. As a result, since the tear portion 24 can be easily broken even when the thickness thereof is large, it is possible to devise to reconcile expansion performance and the quality of the outer appearance (making invisible).

Further, a load on the hinge portion 26 can be reduced. Still further, since the air bag door portion 20 can be constituted of a hard material having a high rigidity, an oil-can-like-feeling and deformation can be prevented. Furthermore, it is possible to reconcile expansion performance and restriction of deterioration in the quality of the outer appearance (weld shrinkage and undulation-shaped unevenness in the base number) transferred to the skin 62, through a simple structure in which the protrusions 28 and 30 are merely provided in the air bag door portion 20. Moreover, a complex mold structure is not required in comparison with coinjection molding, and a post treatment of the tear portion 24 of the base member 60 is not required.

Figure 17A:
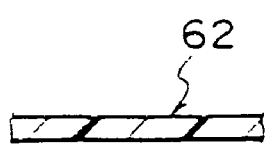
FIG. 17A is a cross-sectional view which shows a skin formed by a skin insert molding in the interior member for the automotive vehicle having the air bag door portion in accordance with the present invention.
Figure 17B:
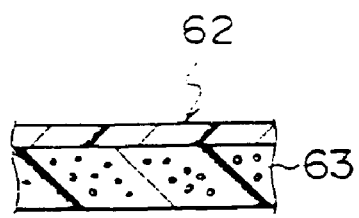
FIG. 17B is a cross-sectional view which shows the skin formed by the skin insert molding in the interior member for the automotive vehicle having the air bag door portion in accordance with the present invention.
Figure 17C:
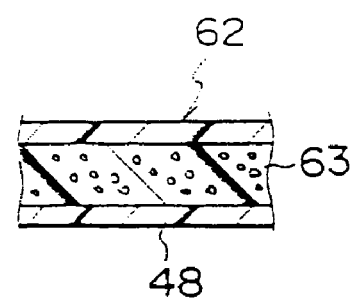
FIG. 17C is a cross-sectional view which shows the skin formed by the skin insert molding in the interior member for the automotive vehicle having the air bag door portion in accordance with the present invention.

Further, in a case of skin insert molding, in addition to the skin 62 of a single layer shown in FIG. 17A, the skin 62 of two layers shown in FIG. 17B and the skin 62 of three layers shown in FIG. 17C may be used. Further, in FIGS. 17A to 17C, reference numeral 63 denotes a foam layer, and reference numeral 48 denotes a barrier layer.

Further, in a case of attachment molding, in addition to the skin 62 of a single layer shown in FIG. 18A, the skin 62 with the foam layer 63 shown in FIG. 18B may be used.

Next, a sixth embodiment of a interior member for an automotive vehicle having an air bag door portion will be described below with reference to FIG. 19.

In this case, the same reference numerals are attached to the same elements as those in the fifth embodiment, and an explanation thereof will be omitted.

Figure 19:
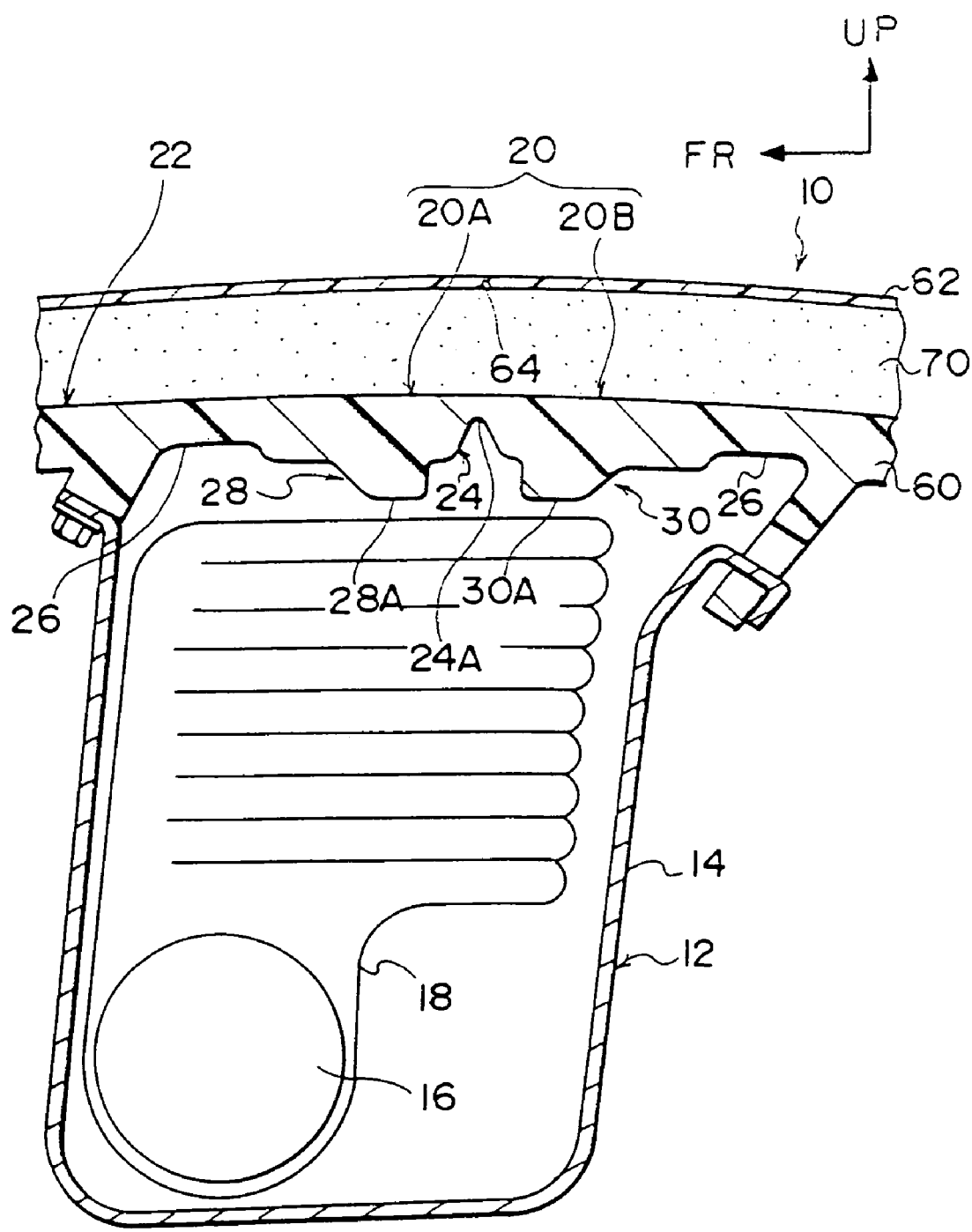
FIG. 19 is a side sectional view corresponding to FIG. 1, showing an interior member for an automotive vehicle having an air bag door portion in accordance with a sixth embodiment of the present invention.

As shown in FIG. 19, in this sixth embodiment, a foam layer 70, for example, constituted of an urethane foam is integrally foamed between the base member 60 and the skin 62.

Next, an operation of the sixth embodiment will be described below.

In this sixth embodiment, when the bag body of the air bag is expanded, the expanding air bag body 18 abuts the lower surfaces 28A and 30A of the protrusions 28 and 30, thereby pressing the protrusions 28 and 30 upward. Accordingly, an impact load acts on the protrusions 28 and 30 from the air bag body 18, breakage is smoothly performed from the center portion 24A of the tear portion 24, and the foam layer 70 and the skin 62 also smoothly break. As a result, since the tear portion 24 can be easily broken even when the thickness thereof is large, it is possible to devise to reconcile expansion performance and the quality of the outer appearance (making invisible).

Further, a load on the hinge portions 26 can be reduced. Still further, since the air bag door portion 20 can be constituted of a hard material having a high rigidity, an oil-can-like-feeling and deformation can be prevented. Furthermore, it is possible to reconcile expansion performance and restriction of deterioration in the quality of the outer appearance (weld shrinkage and an undulation-shaped unevenness) transferred to the skin 62, through a simple structure in which the protrusions 28 and 30 are merely provided in the air bag door portion 20. Moreover, in comparison with the conventional integrally foaming type, a reinforcing iron plate and a fastening part for a separate door base member are not required, and a fastening operation is not required.

Next, a seventh embodiment of a interior member for an automotive vehicle having an air bag door portion will be described below with reference to FIGS. 20 to 22.

In this case, the same reference numerals are attached to the same elements as those in the first embodiment, and an explanation thereof will be omitted.

Figure 20:
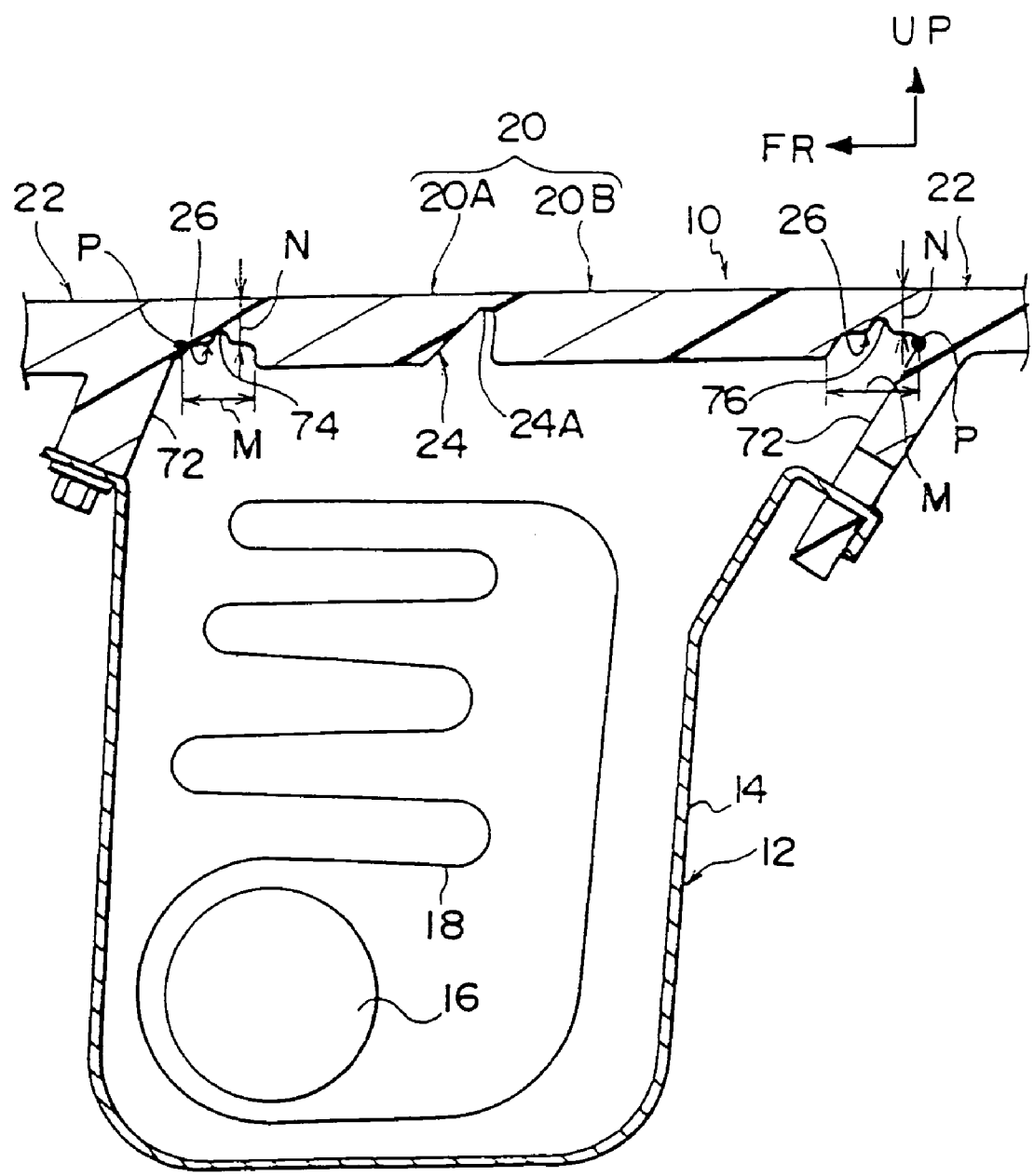
FIG. 20 is a side sectional view corresponding to FIG. 1, showing an interior member for an automotive vehicle having an air bag door portion in accordance with a seventh embodiment of the present invention.

As shown in FIG. 20, in this seventh embodiment, in contrast with the first embodiment, the portions are not formed in the air bag door portion 20, and the hinge portions 26 of the air bag door portion 20 correspond to thin portions having a predetermined thickness N and a predetermined longitudinal width M that is adjacent to case mounting portions 72 for mounting the air bag case 14 formed in the main body portion 22. Further, grooves 74 and 76 having a U-shaped cross section and corresponding to a bending point are formed in the middle of the longitudinal width of the hinge portions 26.

Figure 22:
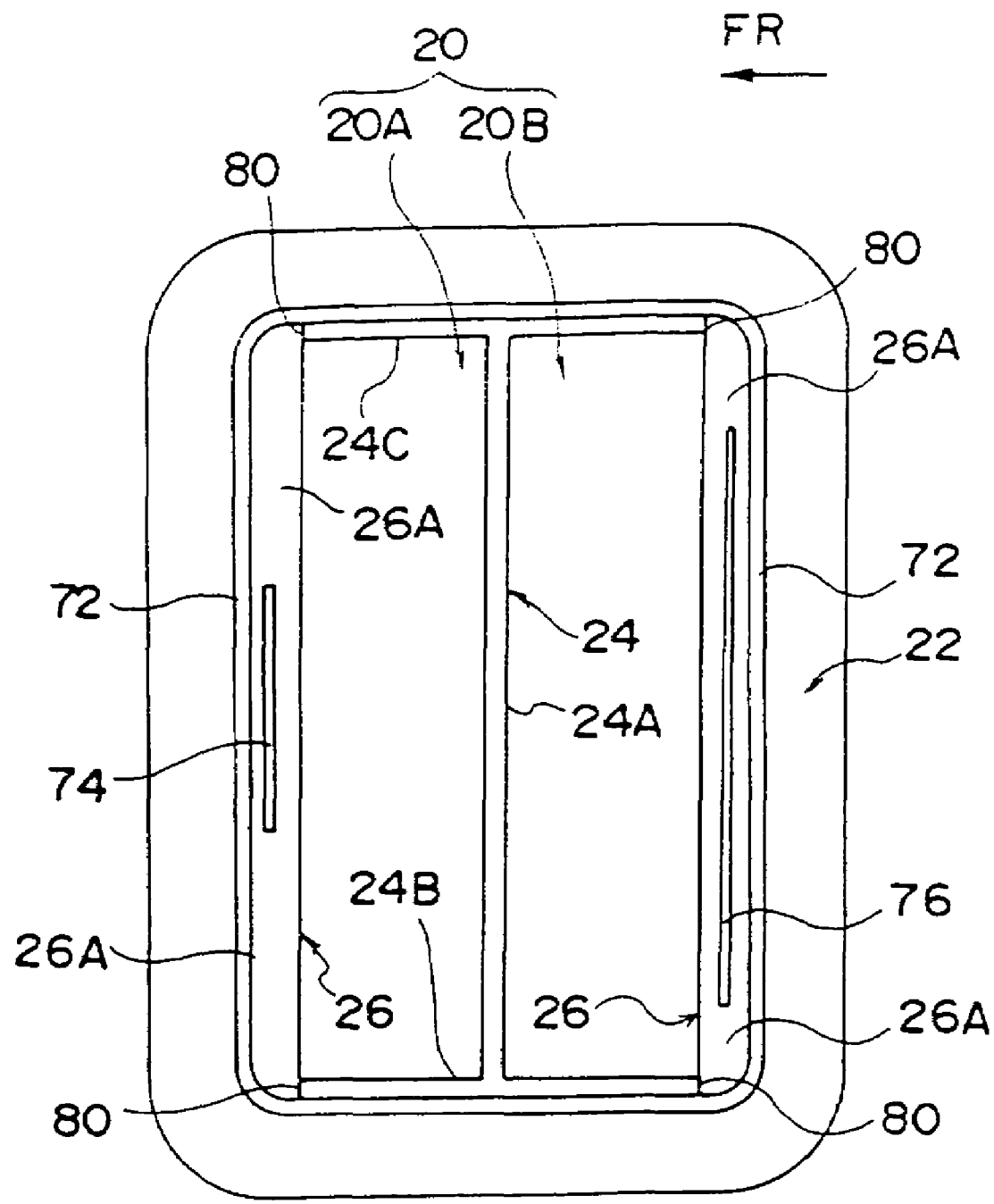
FIG. 22 is an enlarged plan view which shows a reverse face of the air bag door portion in the trim member for the automotive vehicle having the air bag door portion in accordance with the seventh embodiment of the present invention.

As shown in FIG. 22, in the hinge portions 26 of the air bag door portion 20, portions 26A which do not set the grooves 74 and 76 are set at both sides of the groove 76 in the lateral direction, and neither ends of the grooves 74 and 76 continue to the tear lines 24B and 24C in the longitudinal direction of the tear portion 24. Further, in comparison with the groove 74 at the forward side of the automotive vehicle, the groove 76 at the rear side of the automotive vehicle is long, and the depth of the groove 76 is deeper than the depth of the groove 74.

Further, end portions 80 of the tear lines 24B and 24C in the longitudinal direction of the tear portion 24 are all formed in a straight line-terminating form.

Next, an operation of the seventh embodiment will be described below.

Figure 21:
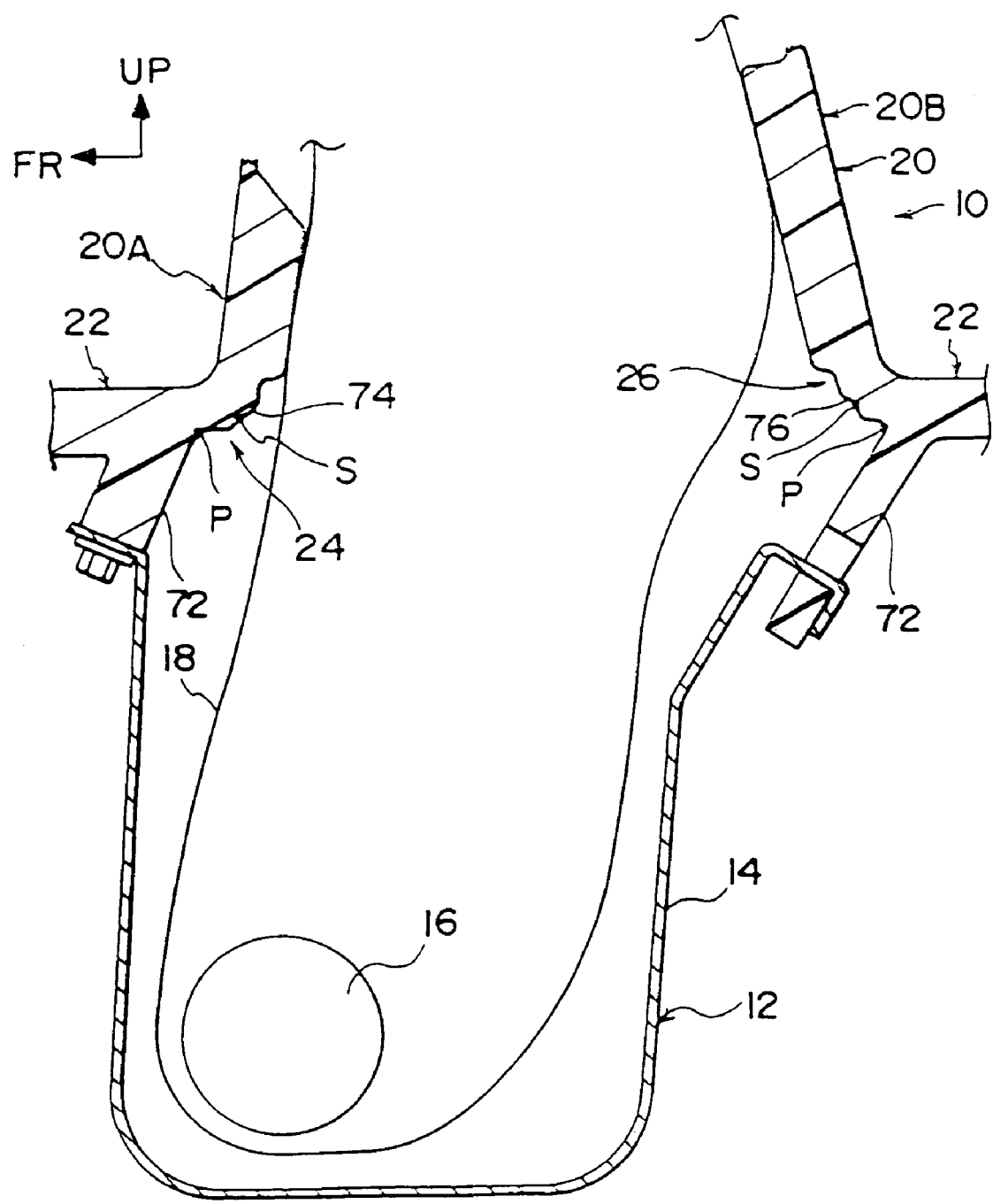
FIG. 21 is a view for explaining an operation, which shows the trim member for the automotive vehicle having the air bag door portion in accordance with the seventh embodiment of the present invention.

In this seventh embodiment, as shown in FIG. 21, a bending point S of the hinge portion of the air bag door portion 20, when the bag body of the air bag is expanded, is positioned at the position of the groove 74, so that it can be placed apart from the boundary P, which is a boundary with respect to the case mounting portion 72 at which the thickness is suddenly changed. As a result, the local bending expansion rate dependent on the bending of the hinge portion 26 (the stretching rate of a skin layer that is outside with respect to the bend) can be made small. Further, since the groove 74 was formed, the surface expansion length of the bending portion can be increased, and the actual expansion rate can be made small, so that the hinge portion 26 can be effectively prevented from breaking due to bending when the bag body of the air bag is expanded.

Further, since the portions 26A which do not set the grooves 74 and 76 are provided in the lateral direction, the hinge portions 26 can be prevented from breaking due to shearing force during an initial period when the bag body of the air bag is exapnding, and the resin fluidity is prevented from being lowered, due to the reduction of the thickness during injection molding, which is dependent upon the grooves 74 and 76 being set. Further, the door expanding angle (the door bending angle) can be adjusted by adjusting the length of the grooves 74 and 76.

Further, since the tear portion 24 of the air bag door portion 20 is formed in an H shape, and since neither ends of the grooves 74 and 76 continue to the tear lines 24B and 24C in the longitudinal direction of the tear portion 24, a broken crack of the grooves 74 and 76 in the direction of the tear lines 24B and 24C due to bending is prevented from expanding.

Further, since the end portion 80 of the tear lines 24B and 24C in the longitudinal direction of the H-shaped tear portion 24 is formed in the straight line-terminating form, a crack due to breakage of the tear portion 24 is prevented from spreading to the hinge portion 26 during an initial period when the bag body of the air bag is expanding.

Moreover, since the length of the groove 76 at the rear side of the automotive vehicle is longer than the length of the groove 74 at the front side of the automotive vehicle, the expansion degree of the rear door portion 20B at the rear side of the automotive vehicle (at the side of the occupant) can be made large, so that the air bag body 18 can be smoothly expanded. Further, the angle of expanding the door (the angle of bending the door) can be easily adjusted by changing the length or the depth of the grooves 74 and 76.

Figure 23A:
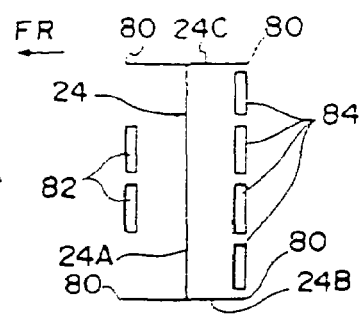
FIG. 23A is a schematic plan view which shows a positional relation between a groove and a tear portion in an interior member for an automotive vehicle having an air bag door portion in accordance with a modified embodiment of the seventh embodiment of the present invention.
Figure 23E:
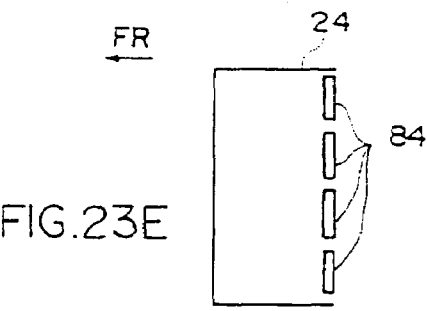
FIG. 23E is a schematic plan view which shows a positional relation between the groove and the tear portion in the interior member for the automotive vehicle having the air bag door portion in accordance with the modified embodiment of the seventh embodiment of the present invention.
Figure 23B:
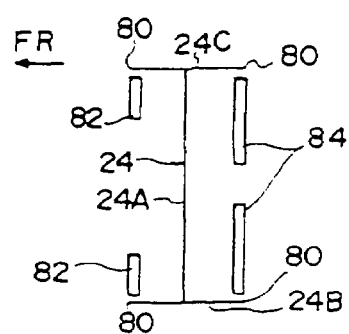
FIG. 23B is a schematic plan view which shows a positional relation between the groove and the tear portion in the interior member for the automotive vehicle having the air bag door portion in accordance with the modified embodiment of the seventh embodiment of the present invention.
Figure 23F:
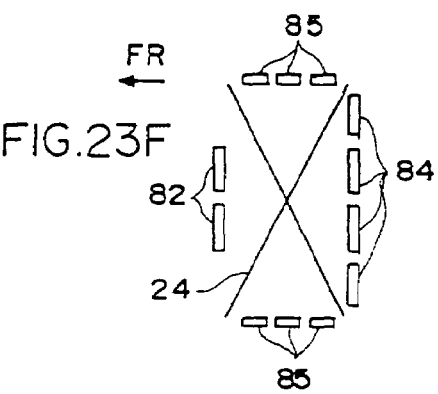
FIG. 23F is a schematic plan view which shows a positional relation between the groove and the tear portion in the interior member for the automotive vehicle having the air bag door portion in accordance with the modified embodiment of the seventh embodiment of the present invention.
Figure 23C:
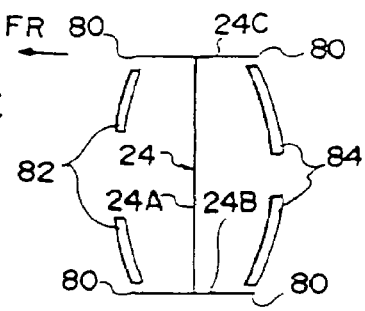
FIG. 23C is a schematic plan view which shows a positional relation between the groove and the tear portion in the interior member for the automotive vehicle having the air bag door portion in accordance with the modified embodiment of the seventh embodiment of the present invention.
Figure 23D:
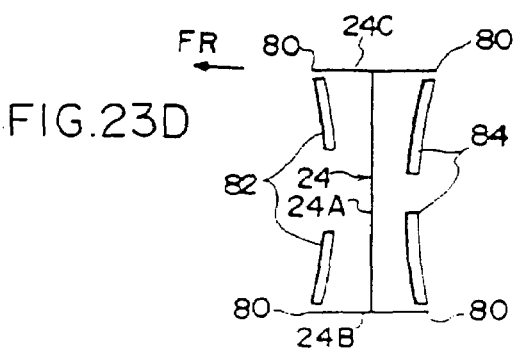
FIG. 23D is a schematic plan view which shows a positional relation between the groove and the tear portion in the interior member for the automotive vehicle having the air bag door portion in accordance with the modified embodiment of the seventh embodiment of the present invention.

Further, in this seventh embodiment, as shown in FIG. 22, the groove 74 at the front side of the automotive vehicle and the groove 76 at the rear side of the automotive vehicle, respectively, are formed one each in the air bag door portion 20; however, the number and the formed position of each of the grooves 74 and 76 are not limited to this, and as shown in FIG. 23A, the grooves 74 and 76 can be separated into a plurality of short grooves 82 and 84, respectively. Further, as shown in FIG. 23B, a position of the separated groove 82 may be near the end portion 80. Still further, in correspondence to a curve of the outer appearance of the air bag door portion 20, the grooves 82 and 84 may be formed in a circular arc shape expanding in a direction in which they mutually move apart from each other as shown in FIG. 23C, or a circular arc shape expanding in a direction in which they mutually move close to each other as shown in FIG. 23D. Accordingly, the resin fluidity can be prevented from being lowered during injection molding, the door hinge portion can be made bendable along the round of the upper surface of the product of the door hinge portion when the door portion is bent and opened, and the door hinge portion can be prevented from breaking. Further, the cross-sectional shape of the grooves 74 and 76 is not limited to the U shape, and other shapes such as a V shape may be employed. Still further, the tear line 24 is not limited to the H shape, a tear line 24 having a C shape as shown in FIG. 23E and a tear line 24 having an X shape as shown in FIG. 23F may be employed. In this case, reference numeral 85 in FIG. 23F denotes a separated groove.

Next, an eighth embodiment of a interior member for an automotive vehicle having an air bag door portion will be described below with reference to FIGS. 24 to 28.

In this case, the same reference numerals are attached to the same elements as those in the first embodiment, and an explanation thereof will be omitted.

Figure 24:
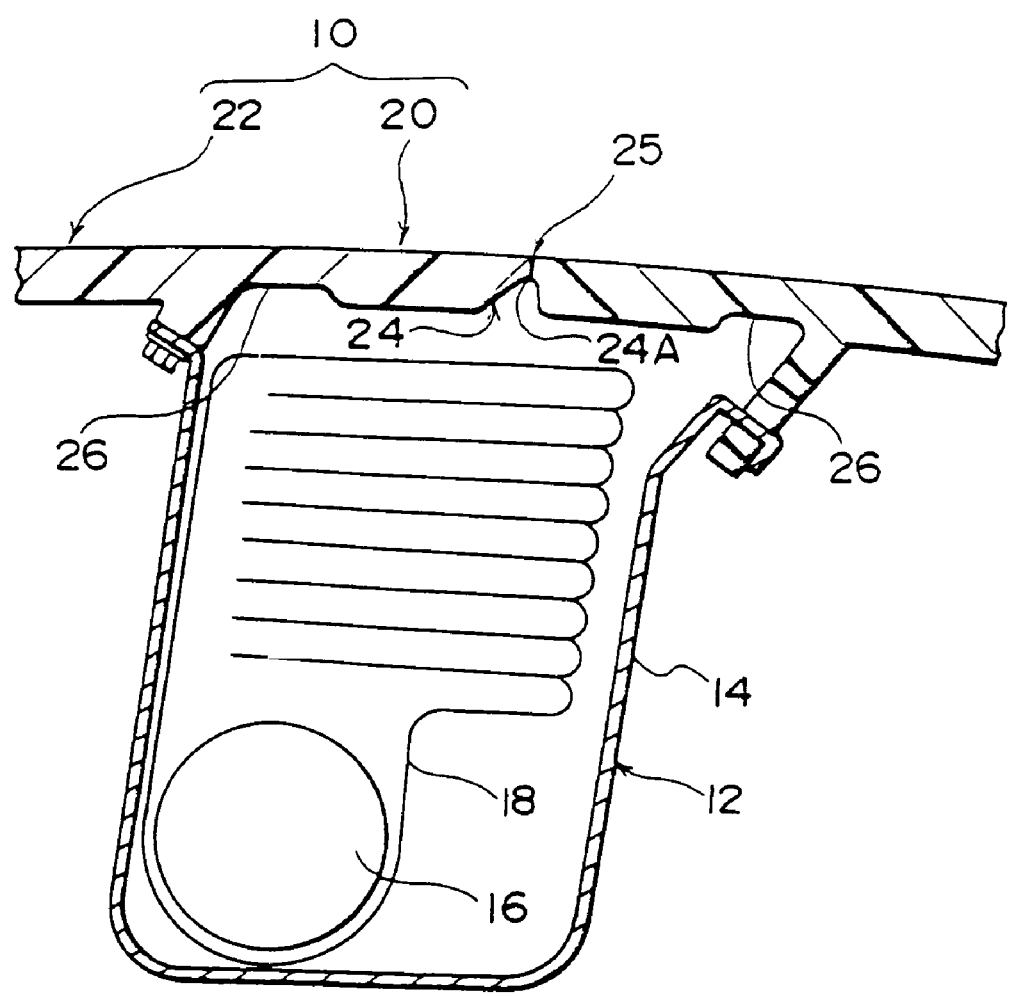
FIG. 24 is an enlarged cross-sectional view along a line 1—1 in FIG. 25.
Figure 26:
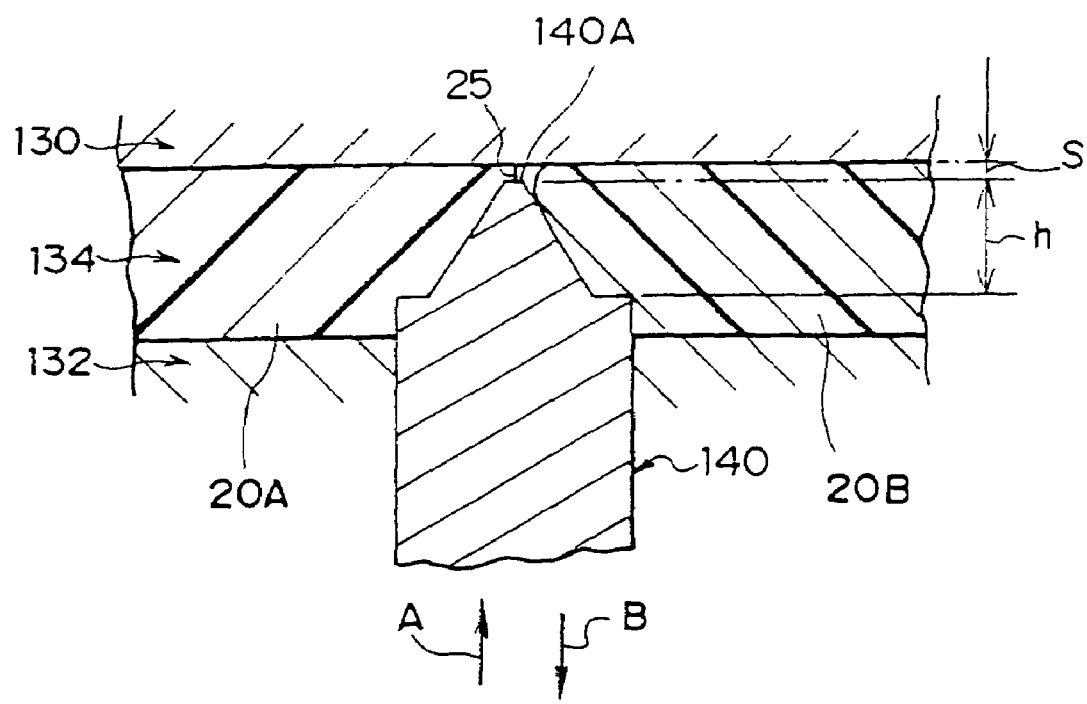
FIG. 26 is a schematic cross-sectional view which shows a process in a method of forming the trim member for the automotive vehicle integrally having the air bag door portion in accordance with the eighth embodiment of the present invention.

As shown in FIG. 24, a cross section of the thin portion 24 is formed in a V shape, and as shown in FIG. 26, a height h of the V shape in the thin portion 24 is set to a range not more than the general thickness of the air bag door portion, for example, $0<h\leq 5$ mm. Here, in a case wherein the general further increased. Then, the vicinity of the distal end (a bottom portion) 24A corresponds to the tear portion when the air bag door portion is expanded, and a resin fluidity boundary 25 between the resin constituting the front door portion 20A of the air bag door portion 20 and the resin constituting the rear door portion 20B is set near the distal end 24A.

Next, a method of forming the instrument panel in accordance with this embodiment will be described in detail.

First, as shown in FIG. 26, a resin is injected into an upper mold 130 which is a mold at an outer appearance side of the instrument panel and into a cavity for the upper mold 130 and a lower mold 132 from a predetermined different gate G1 or a gate G2 (refer to FIG. 25) so as to mold the front door portion 20A of the air bag door portion 20, and further, a resin is injected from the gate G1 or the gate G2 so as to mold the rear door portion 20B. At this time, as shown in FIG. 26, a distal end 140 of a slide core 140 substantially formed in a triangular shape in cross section is disposed near the upper mold 130 with a slight initial gap S ($0<S\leq 2$ mm) therebetween, thereby substantially separating the cavity 134.

In this case, the slide core 140 is arranged within the lower mold 132 so as to be movable in directions of moving near to and apart from the upper mold 130 (a direction of an arrow A and a direction of an arrow B in FIG. 26).

Further, as shown in FIG. 28 which exemplifies a molding condition, a time T2 of starting the injection of the gate G1 is delayed for a time TS (a start delay time) with respect to a time T1 of starting the injection of the gate G2. In this way, an adjustment is performed so that a time lag TL between a time T3 at which the resin of the front door portion 20A injected and fluidized via the gate G1 reaches the distal end 140 of the slide core 140 and fills the front door portion 20A, and a time T4 at which the resin of the rear door portion 20B injected and fluidized via the gate G2 reaches the distal end 140 of the slide core 140 and fills the rear door portion 20B becomes small. (This is in order to prevent a slight disadvantage with respect to ease of opening and breaking during expansion of the air bag body, due to the shift between the resin fluidizing boundary 25 of the skin layer portion and the distal end 24A of the thin portion 24 becoming large when the time lag TL becomes large.) Further, at a predetermined point T7 within a range TM between the time T3 at which the resin of the front door portion 20A reaches the distal end 140 of the slide core 140 and a keep pressure completion time T6, the slide core 140 is instantaneously moved (core back) to a position (a position shown by a solid line in FIG. 27) which corresponds to a position being a predetermined amount L (within a range which is not more than the general thickness of the air bag door portion, for example, $0<L\leq 5$ mm). Further, when the general thickness of the door portion is large, the L may be larger) descended from and in a direction of moving apart from a position (a position shown by a double-dashed chain line in FIG. 27) near the upper mold 130 in a moment.

Figure 27:
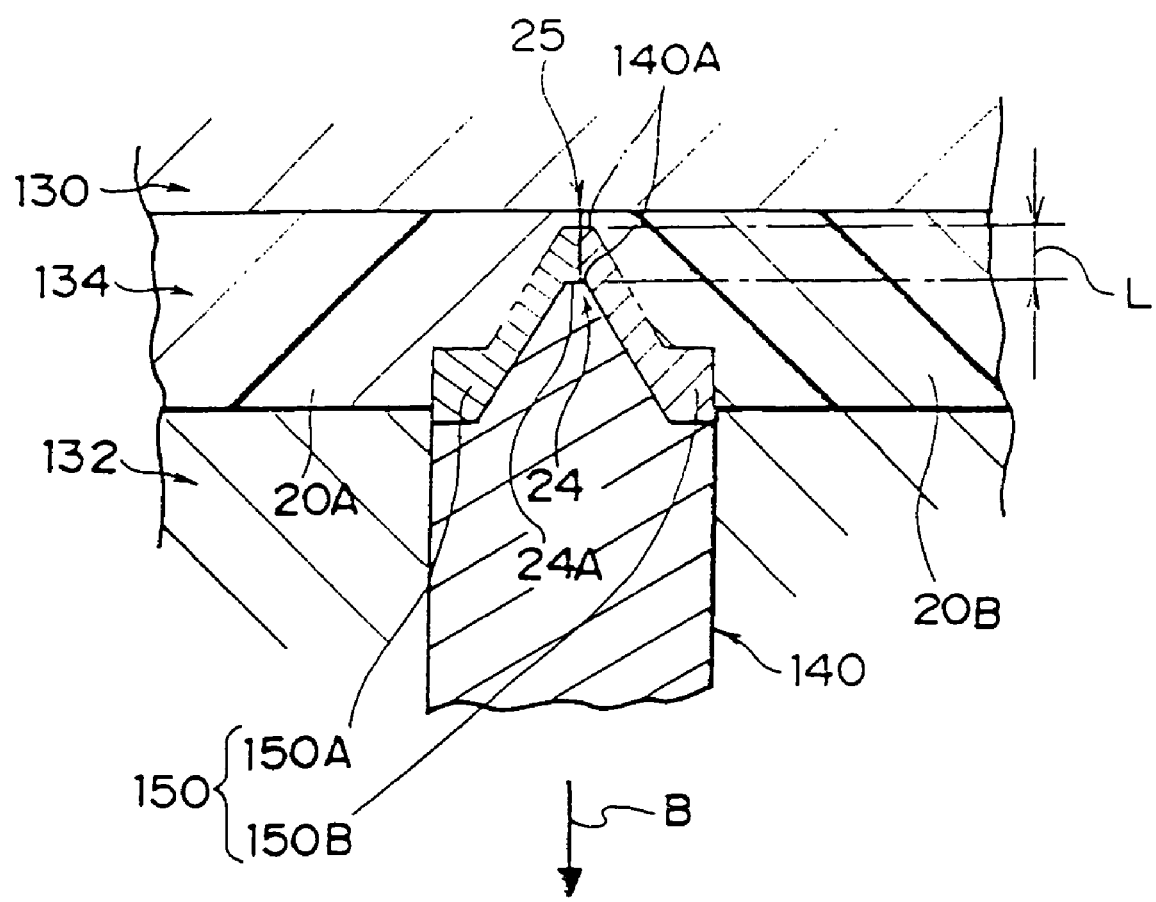
FIG. 27 is a schematic cross-sectional view which shows a process in a method of forming the trim member for the automotive vehicle integrally having the air bag door portion in accordance with the seventh embodiment of the present invention.

Therefore, a space 150 corresponding to the moved volume of the slide core 140 is generated, a front space 150A of the space 150 is filled with the resin of the front door portion 20A by the time of the keep pressure completion time T6, and a rear space 150B of the space 150 is filled with the resin of the rear door portion 20B, so that the dsital end (the bottom portion) of the thin portion 24 and the resin fluidizing boundary 25 coincide with each other in this portion so as to enter a state shown in FIG. 27. In this case, in FIG. 27, for the purpose of making comprehension easy, the front space 150A and the rear space 150B filled with the resin are indicated with different hatching. Further, a time T5 shown in FIG. 28 denotes a keep pressure starting time; after the keep pressure completion time T6 has passed, the process moves on to cooling.

Here, setting a keep pressure and a preferable core back timing will be described below.

The keep pressure is generally speaking pressure, that is further applied, after the injection is completed, to the resin injected at a pressure of about half the injection pressure and is performed for stabilizing the weight, size and shape of the formed product. In accordance with the present embodiment, as shown by a solid line in FIG. 33, the keep pressure is decreased, separating into two stages comprising V1 and V2. Since a value V1 of the first stage of the keep pressure greatly affects the quality of the product, it is difficult to change it only for a resin combination (weld) strength of the tear portion of the present embodiment, and the degree of freedom is low. On the contrary, since a value V2 of the second stage of the keep pressure does not greatly affect the quality of the product because of the effect of the first stage of the keep pressure, it is easy to change, and the degree of freedom is high. Accordingly, the core back timing of the slide core 140 is preferably set to a time after the first stage of the keep pressure has passed, at which it is hard to generate a poor product, that is, during the second stage of the keep pressure.

On the contrary, as is generally known, as factors exerting an influence upon the melting strength of the resin, there are; the surface pressure between the resins, and a resin temperature (the lower the surface pressure and the resin temperature are, the more the melting strength is decreased). Accordingly, in accordance with the present embodiment, the invention is structured such that a break force of the tear portion is controlled to a desired value by controlling the surface pressure between the resins on the melting surface of the tear portion with the keep pressure and controlling the resin temperature on the melting surface of the tear portion with the core back timing and the thickness in the periphery of the tear portion.

Next, the points mentioned above will be described in detail.

Figure 36:
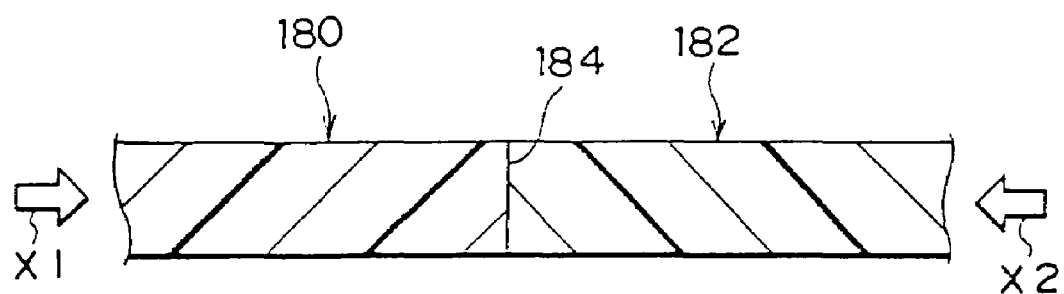
FIG. 36 is a cross-sectional view which explains two factors influencing the weld strength between a first resin and a second resin.

As shown in FIG. 36, a first resin 180 and a second resin 182 are mutually bonded to each other by being respectively pressed in pressing directions (a direction shown by an arrow X1 and a direction shown by an arrow X2) with a predetermined force, after the respective melting surface temperatures have been previously increased so as the surfaces are in a melting state. With respect to the melting strength of the melting surface 184 between the first resin 180 and the second resin 182, based on melting principles, there have been generally known two factors exerting an influence upon the melting strength, that is, the surface pressure between the resins of the melting surface 184 and the resin temperature.

Thus, in view of controlling the melting strength of the tear portion in accordance with the present embodiment, the same thinking can be applied. That is, after fluidization, in a state wherein solidification has began to occur, a control is performed with respect to the bonding portion (the melting portion) of the fluidizing resin, replacing the keep pressure which is the pressure within the mold relating to the surface pressure transmitted to the melting surface, with the core back timing and the thickness in the periphery of the tear, relating to the resin temperature (at which the resin of the melting surface portion is cooled from the melting state in accordance with the time passed) of the melting surface.

Figure 37A:
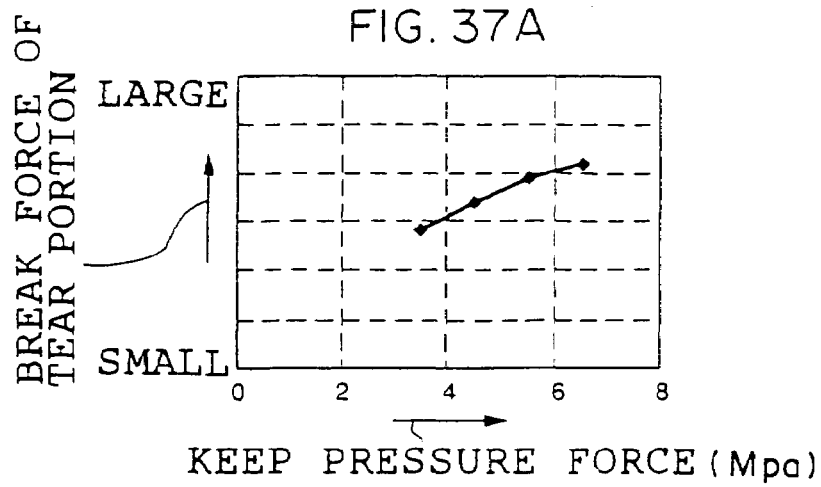
FIG. 37A is a graph which shows a relation between the keep pressure and the tear portion break force.
Figure 37B:
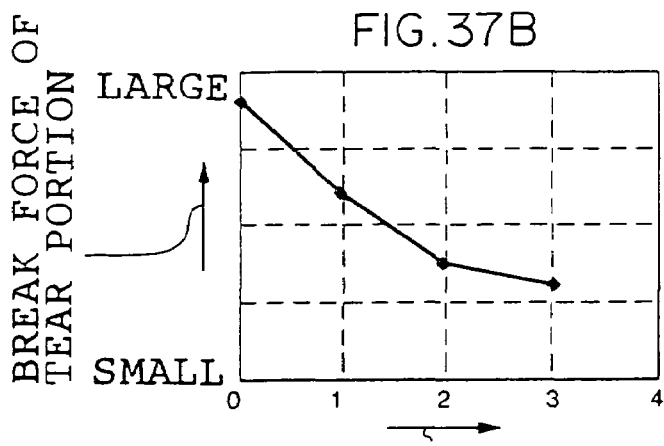
FIG. 37B is a graph which shows a relation between the core back timing and the tear portion break force.
Figure 37C:
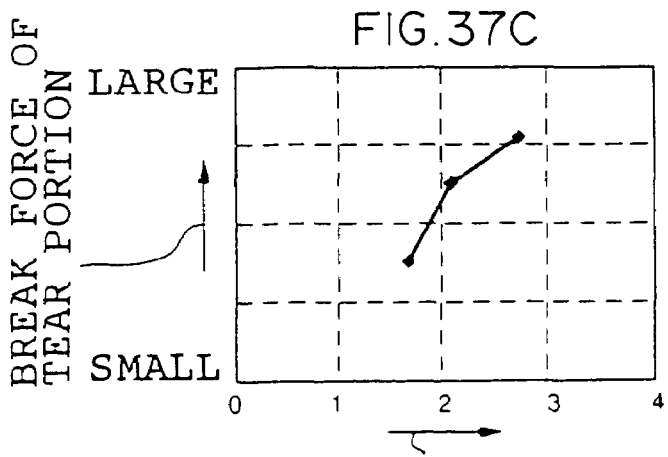
FIG. 37C is a graph which shows a relation between the thickness in a periphery of the tear portion and the tear portion break force.

For example, in a case wherein the injection pressure from the gate of 13.5 Mpa, an injection time of 6 sec, a keep pressure of 6.5 Mpa (a first step), 5.5 Mpa (a second step), a keep pressure time of 2+7 sec, the same product weight and the same test material are used, as shown in FIG. 37A, the higher the keep pressure, the higher the surface pressure transmitted to the melting surface, and the tear portion breaking force increases. Further, as shown in FIG. 37B, the later the core back timing is set, the longer the time for cooling is, so that the resin temperature of the melting surface is reduced, and the tear portion breaking force is reduced. Still further, as shown in FIG. 37C, the higher the height of the V shape is set, that is, the thicker the thickness in the periphery of the tear portion is set, the harder it is to reduce the resin temperature of the melting surface, so that the tear portion break force is increased.

Accordingly, the break strength of the tear portion can be easily and accurately controlled to a desired value with a combination of the keep pressure, the core back timing and the thickness in the periphery of the tear portion.

Further, when the core back timing is too early in comparison with the filling completion, the filled resin fluidizes within a space at the unfilled side, and the resin fluidizing boundary is shifted from the breakage expected portion which depends on the slide core; however, in comparison, in a case wherein the core back timing is set to after filling is completed, the resin fluidizing boundary and the breakage expected portion are prevented from being shifted.

In this case, as shown in FIG. 28, it is preferable to set the core back timing T7 of the slide core 140 after the first stage of the keep pressure time between the keep pressure starting time (T5) and the keep pressure completion time (T6), which is after the filling of the gates G1 and G2, has passed, and it is most preferable to set the core back timing to a time immediately after the first stage of the keep pressure time has passed so that the resin temperature is not too low.

Figure 33:
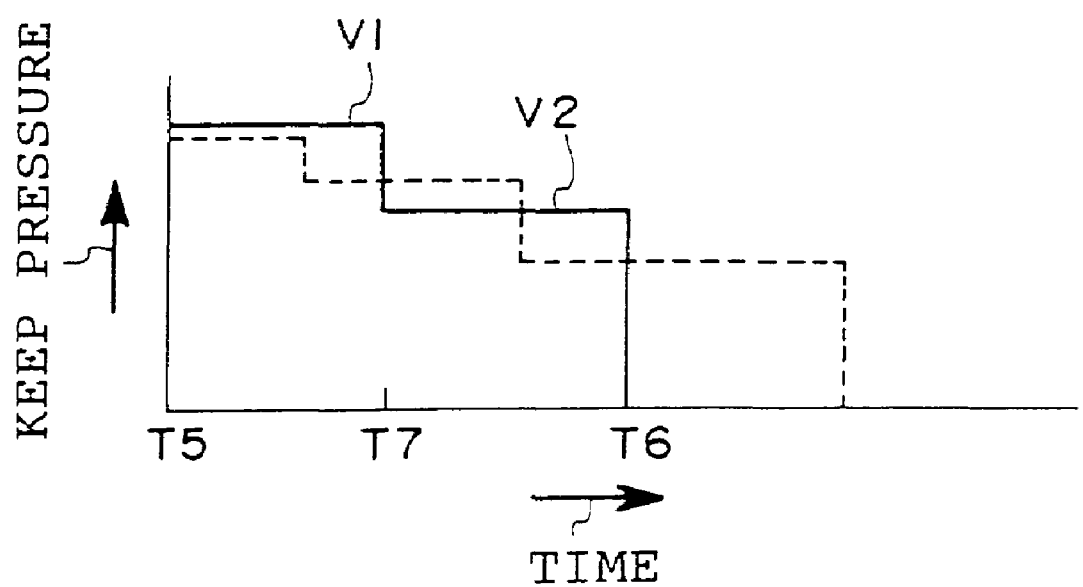
FIG. 33 is a graph which shows a variation in the keep pressure during formation of the trim member for the automotive vehicle integrally having the air bag door portion in accordance with the eighth embodiment of the present invention.

Further, as shown by a broken line in FIG. 33, the keep pressure may be separated and reduced in a plurality of stages of three stages or more and the core back timing may be set to after the second stage of the keep pressure. In this case, since the first stage of the keep pressure is reliably performed by setting the core back timing to after the second stage of the keep pressure, the weight, size and shape of the formed product can be stabilized, so that generation of poor products can be reduced.

In accordance with the steps mentioned above, as shown in FIG. 27, the thin portion 24 having the V-shaped cross section can be formed by the distal end 140A of the slide core 140, and the moved amount L of the slide core 140 is small, so that the resin fluidizing boundary 25 is set at the distal end 24A of the thin portion 24.

Accordingly, in the instrument panel 10 in accordance with the present embodiment, by setting the resin fluidizing boundary 25 near the core back area of the slide core 140 which is for forming the thin portion 24 as the tear portion when the air bag door portion is expanded, that is, near the distal end 24A of the thin portion 24, the break force of the tear portion can be reduced to a desired value due to thickness control and strength reduction, which is dependent on the resin fluidizing boundary 25. Therefore, since it is not necessary to significantly reduce the resin thickness (the initial gap S+the slide core stroke amount L) of the tear portion, the quality of the outer appearance is prevented from being lowered, and the line of the tear portion is not seen from the outer appearance side at all, so that heat resistance and aging performance is improved and support and surface rigidity of a whole of the air bag door portion is also improved. Further, since the air bag door portion 20 and the main body portion 22 of the instrument panel 10 are molded of the same resin, it is not necessary to paint in a separate manner in accordance with the materials (two kinds), so that low cost can be achieved.

Further, in the method of forming the instrument panel in accordance with the present embodiment, the resin fluidizing boundary 25 can be set at the core back area of the slide core 140, which is for forming the thin portion 24 as the tear portion when the air bag door portion is expanded, by a simple method comprising steps of: separating the cavity 134 of the air bag door portion as the tear portion, with the slide core 140 having the distal end formed in a substantially triangular shape; injecting the resin into each of the separated cavities in this state; and moving back the slide core 140 a small amount L under a condition at about the time filling of the resin is completed. As a result, since conventional equipment can be used, it can be formed at a low cost. Further, since a simple method is employed, high reliability can be achieved in securing a functional quality, and productivity is high.

In the above description, the present invention has been explained in detail with respect to the specified embodiments; however, the present invention is not limited to the embodiments mentioned above, and it is obvious for those skilled in the art to modify the embodiments to the other various kinds of embodiments within the scope of the present invention. For example, the cross-sectional shape of the tear portion 24 may be made into other shapes such as a U shape or the like in addition to the V shape. Further, the present invention can be applied to a door trim, a center pillar, a garnish, a handle and the like in addition to the instrument panel.

Further, in the eighth embodiment, the structure is made such that the initial gap S (0<S≦2 mm) is provided between the distal end 140 of the slide core 140 and the upper mold 130 so as to prevent the distal end 140 of the slide core 140 and the upper mold 130 from interfering with each other, thereby taking into consideration a draw scratch prevention on the mold surface and securing of durability; however, in a case wherein the time lag TL is great, the structure may be made such that the initial gap S is set to be 0.1≦S≦0.8 mm and the shift between the resin fluidizing boundary 25 in the skin layer portion and the distal end 24A of the thin portion 24 is increased. In this case, it becomes slightly disadvantageous with respect to ease of opening and breaking when the bag body of the air bag is expanded; however, the quality of the outer appearance of the tear portion line from the outer appearance side in the distal end 24A can be improved in the same thickness. Further, the structure may be made such that an initial gap of S=0 is set and the front end 140 A of the slide core 140 abuts the upper mold 130 as occasion demands.

Further, in the eighth embodiment, the injection start time T2 for the gate G1 is delayed the time TS (the start shift time) with respect to the injection start time T1 for the gate G2; however, in place of this, the structure may be made such that the injection is first performed from the gate G1 in accordance with the positional relation between the gates G1 and G2, and the injection from the gate G2 is delayed the time TS so as to make the filling interval time (the time lag) TL small. Still further, it is also fine if the time that the resin of the front door portion 20A injected from the gate G1 reaches the distal end 140 of the slide core 140 and the time T4 that the resin of the rear door portion 20B injected from the gate G2 reaches the distal end 140 of the slide core 140 are made about the same, by making the injection start time T2 for the gate G1 and the injection start time T1 for the gate G2 the same.

Figure 29A:
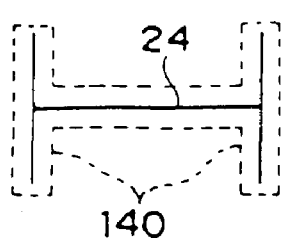
FIG. 29A is a schematic plan view which shows an area of a slide core with respect to an H-shaped thin portion of the trim member for the automotive vehicle integrally having the air bag door portion in accordance with the eighth embodiment of the present invention.
Figure 29B:
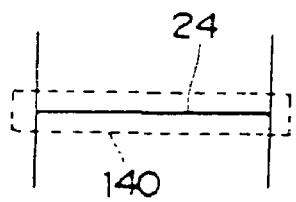
FIG. 29B is a schematic plan view which shows an area of the slide core with respect to the H-shaped thin portion of the trim member for the automotive vehicle integrally having the air bag door portion in accordance with the eighth embodiment of the present invention.
Figure 29C:
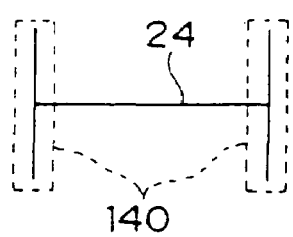
FIG. 29C is a schematic plan view which shows an area of the slide core with respect to the H-shaped thin portion of the trim member for the automotive vehicle integrally having the air bag door portion in accordance with the eighth embodiment of the present invention.
Figure 29D:
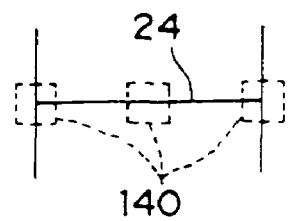
FIG. 29D is a schematic plan view which shows an area of the slide core with respect to the H-shaped thin portion of the trim member for the automotive vehicle integrally having the air bag door portion in accordance with the eighth embodiment of the present invention.
Figure 29E:
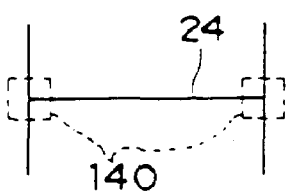
FIG. 29E is a schematic plan view which shows an area of the slide core with respect to the H-shaped thin portion of the trim member for the automotive vehicle integrally having the air bag door portion in accordance with the eighth embodiment of the present invention.
Figure 29F:
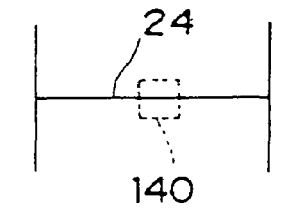
FIG. 29F is a schematic plan view which shows an area of the slide core with respect to the H-shaped thin portion of the trim member for the automotive vehicle integrally having the air bag door portion in accordance with the eighth embodiment of the present invention.
Figure 29G:
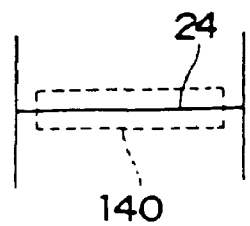
FIG. 29G is a schematic plan view which shows an area of the slide core with respect to the H-shaped thin portion of the trim member for the automotive vehicle integrally having the air bag door portion in accordance with the eighth embodiment of the present invention.

Still further, an area at which the slide core 140 is provided is the area which satisfies the expansion performance and is allowed by the mold structure, and may be the whole area of the H-shaped thin portion 24 as shown in FIG. 29A; however, as shown in FIG. 29B, the area of the slide core 140 may be set to be only the area along the lateral line of the H-shaped thin portion 24. Further, as shown in FIG. 29C, the area of the slide core 140 may be set to be only the area along the vertical line of the H-shaped thin portion 24. Moreover, as shown in FIGS. 29D to 29G, the area of the slide core 140 may be set to be only an extreme one portion of the H-shaped thin portion 24.

Figure 30A:
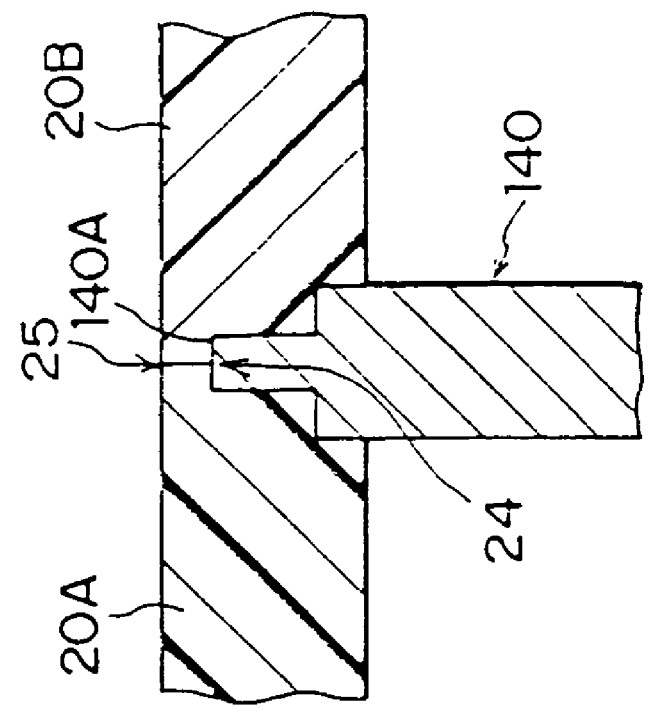
FIG. 30A is a schematic cross-sectional view which shows a cross-sectional shape of a thin portion of a trim member for an automotive vehicle integrally having an air bag door portion in accordance with an applied embodiment of the eighth embodiment of the present invention.
Figure 30B:
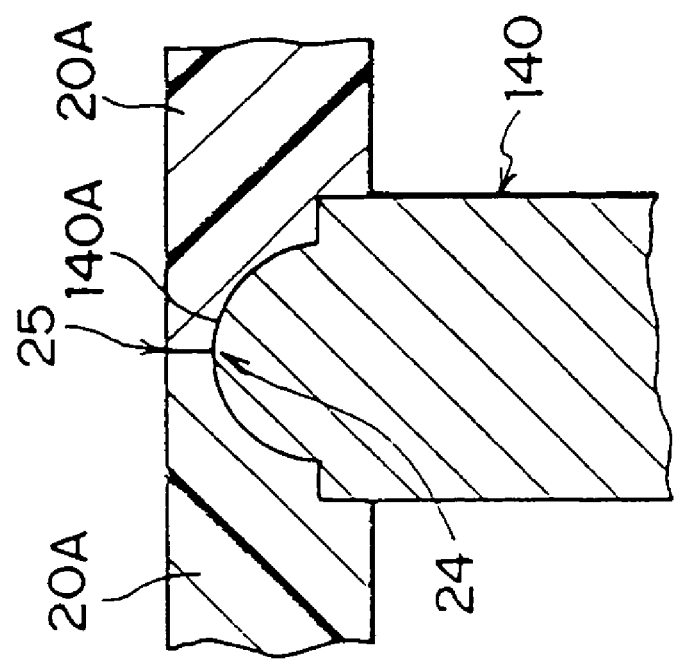
FIG. 30B is a schematic cross-sectional view which shows a cross-sectional shape of the thin portion of the trim member for the automotive vehicle integrally having the air bag door portion in accordance with the applied embodiment of the eighth embodiment of the present invention.

Furthermore, the cross-sectional shape of the thin portion 24 may be formed in an R shape as shown in FIG. 30A or a step shape as shown in FIG. 30B in addition to the V shape.

Moreover, the timing of the core back of the slide core 140 may be performed during the cooling time after the time T6 as far as the resin can fluidize, not only during a moment in the time between the time T3 and the time T6 in FIG. 28. Further, the speed of the core back of the slide core 140 may be an instantaneous speed or a slow speed requiring a time from the time T3 to the time T6. Still further, since the resin of the front door portion 20A is filled not only from the gate G1 but also from the gate G2 in a go-round manner, the gate may be single.

Figure 25:
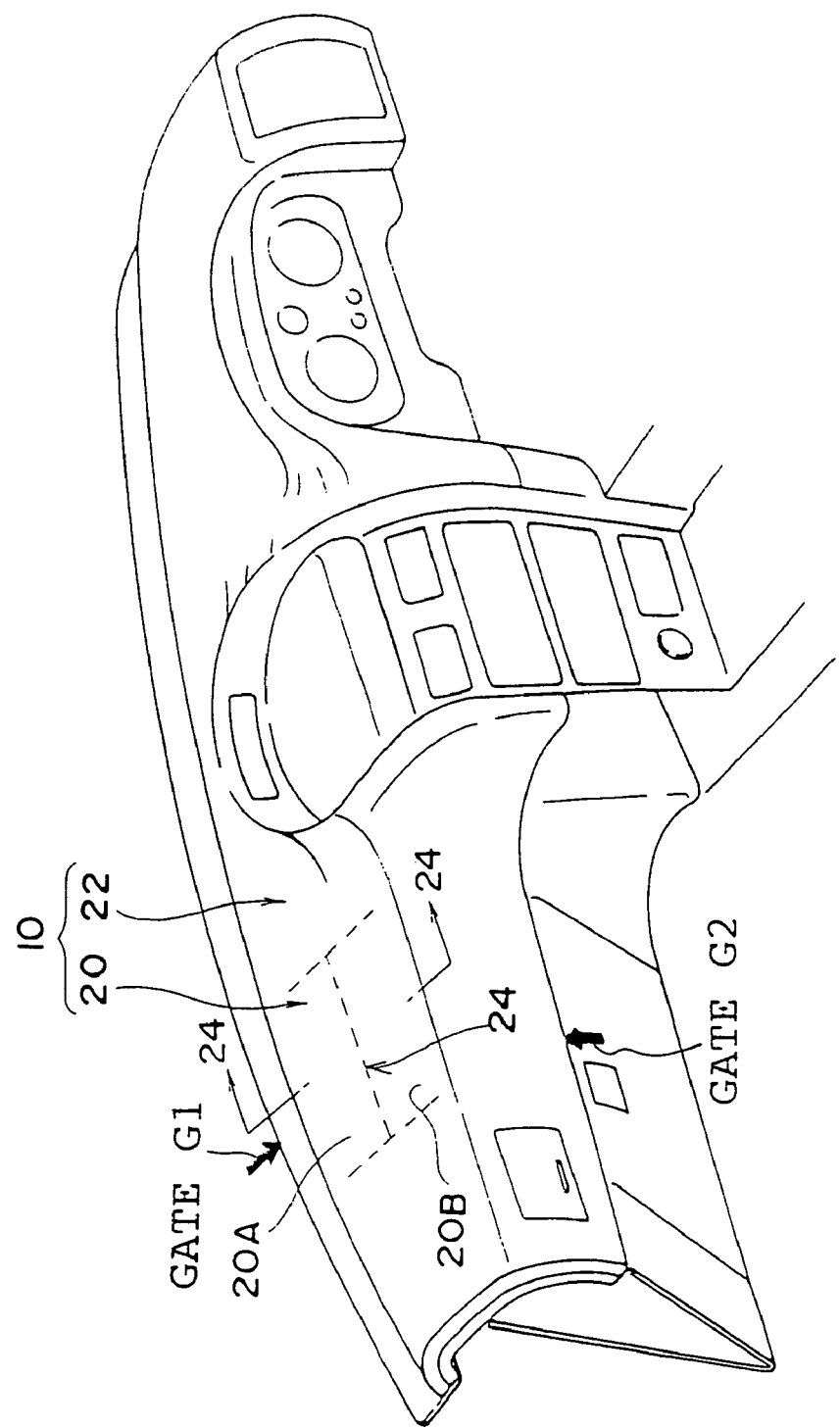
FIG. 25 is a perspective view which shows an interior member for an automotive vehicle integrally having an air bag door portion in accordance with an eighth embodiment of the present invention.

Further, the forming method in accordance with the eighth embodiment is not limited to the air bag door portion of a double-leafed hinged door type in which the thin portion 24 as shown in FIG. 25 is formed in the H shape in a plan view, but may be applied to an instrument panel having an air bag door portion in which the thin portion 24 is formed in another shape such as a C shape, an X shape or the like in a plan view, and to a method of forming the same.

Figure 29H:
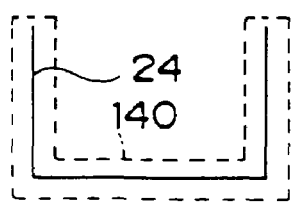
FIG. 29H is a schematic plan view which shows an area of a slide core with respect to a C-shaped thin portion of a trim member for an automotive vehicle integrally having an air bag door portion in accordance with an applied embodiment of the present invention.
Figure 29I:
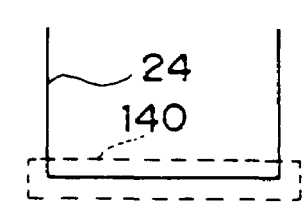
FIG. 29I is a schematic plan view which shows an area of the slide core with respect to the C-shaped thin portion of the trim member for the automotive vehicle integrally having the air bag door portion in accordance with the applied embodiment of the present invention.
Figure 29J:
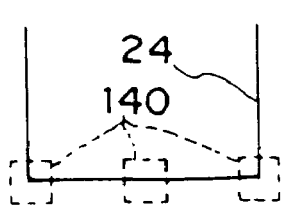
FIG. 29J is a schematic plan view which shows an area of the slide core with respect to the C-shaped thin portion of the trim member for the automotive vehicle integrally having the air bag door portion in accordance with the applied embodiment of the present invention.
Figure 29K:
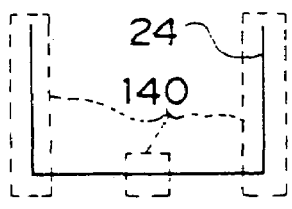
FIG. 29K is a schematic plan view which shows an area of the slide core with respect to the C-shaped thin portion of the trim member for the automotive vehicle integrally having the air bag door portion in accordance with the applied embodiment of the present invention.

Further, a range in which the slide core 140 is provided in a case wherein the thin portion 24 is formed in a C shape in a plan view is the range which satisfies expansion performance and which is allowed by the mold structure, and may be the whole area of the C-shaped thin portion 24 as shown in FIG. 29H; however, as shown in FIG. 29I, the area of the slide core 140 may be set to be only the area along a lateral line of the C-shaped thin portion 24. Furthermore, as shown in FIGS. 29J and 29K, the area of the slide core 140 may be set to be only an extreme one portion of the C-shaped thin portion 24.

Figure 31:
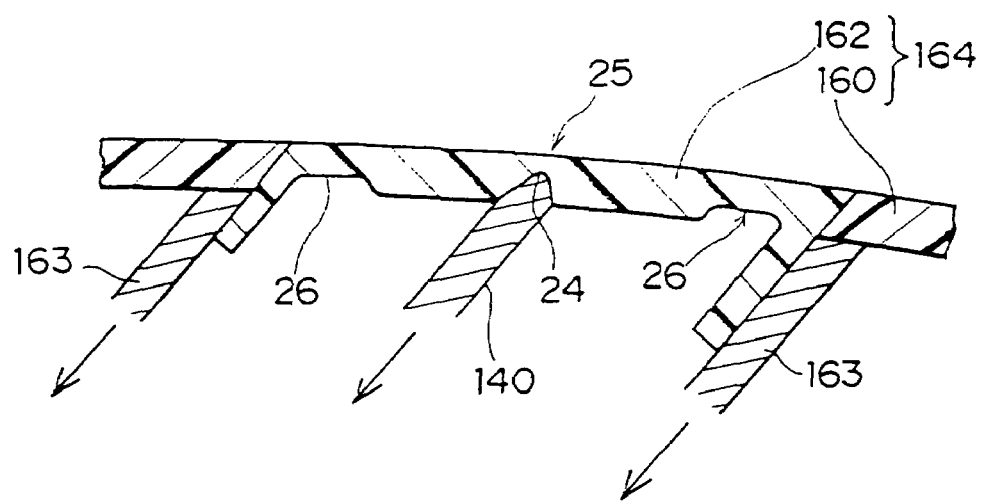
FIG. 31 is a schematic cross-sectional view which shows a step in a forming process for the trim member for the automotive vehicle integrally having the air bag door portion in accordance with the applied embodiment of the eighth embodiment of the present invention.

Further, the forming method in accordance with the eighth embodiment can be applied to an instrument panel 164 having an air bag door portion in which a main body portion 160 and an air bag door portion 162 are integrally formed by coinjection molding which depends on a slide core 163, using different resins for the main body portion 160 and the air bag door portion 162 of the instrument panel, as shown in FIG. 31.

Figure 32A:
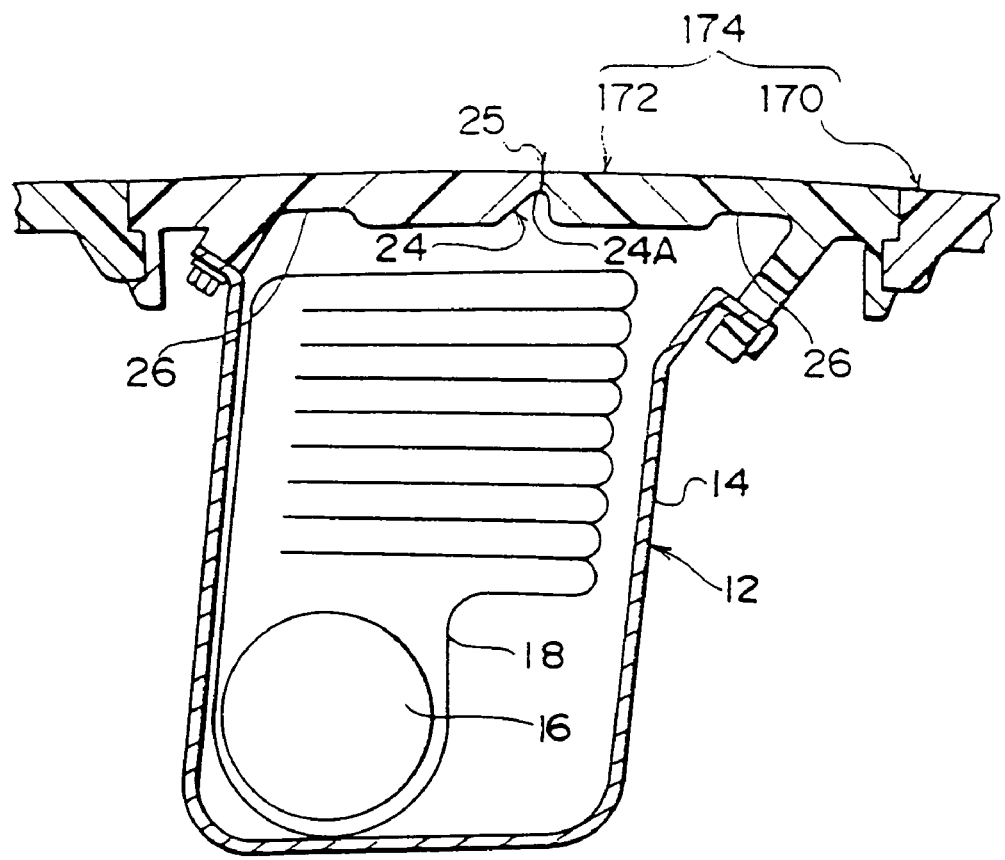
FIG. 32A is a side sectional view which shows an air bag door portion of an interior member for an automotive vehicle integrally having an air bag door portion in accordance with an applied embodiment of an embodiment of the present invention.
Figure 32B:
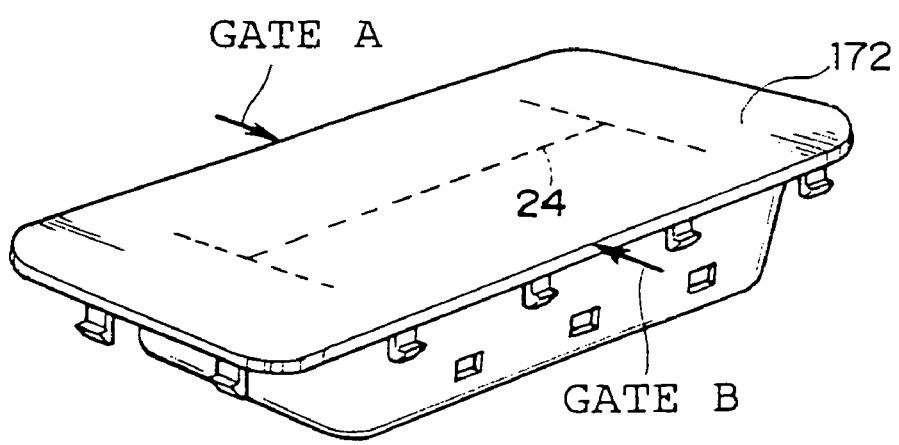
FIG. 32B is a perspective view which shows the air bag door portion of the trim member for the automotive vehicle integrally having the air bag door portion in accordance with the applied embodiment of the embodiment of the present invention.

Still further, the forming method in accordance with the eighth embodiment can be applied to an instrument panel 174 having an air bag door portion which is integrally assembled with an engaging hook, a screw or the like after injection molding, using a resin, a main body portion 170 and an air bag door portion 172 of a separate instrument panel, as shown in FIGS. 32A and 32B.

Figure 34:
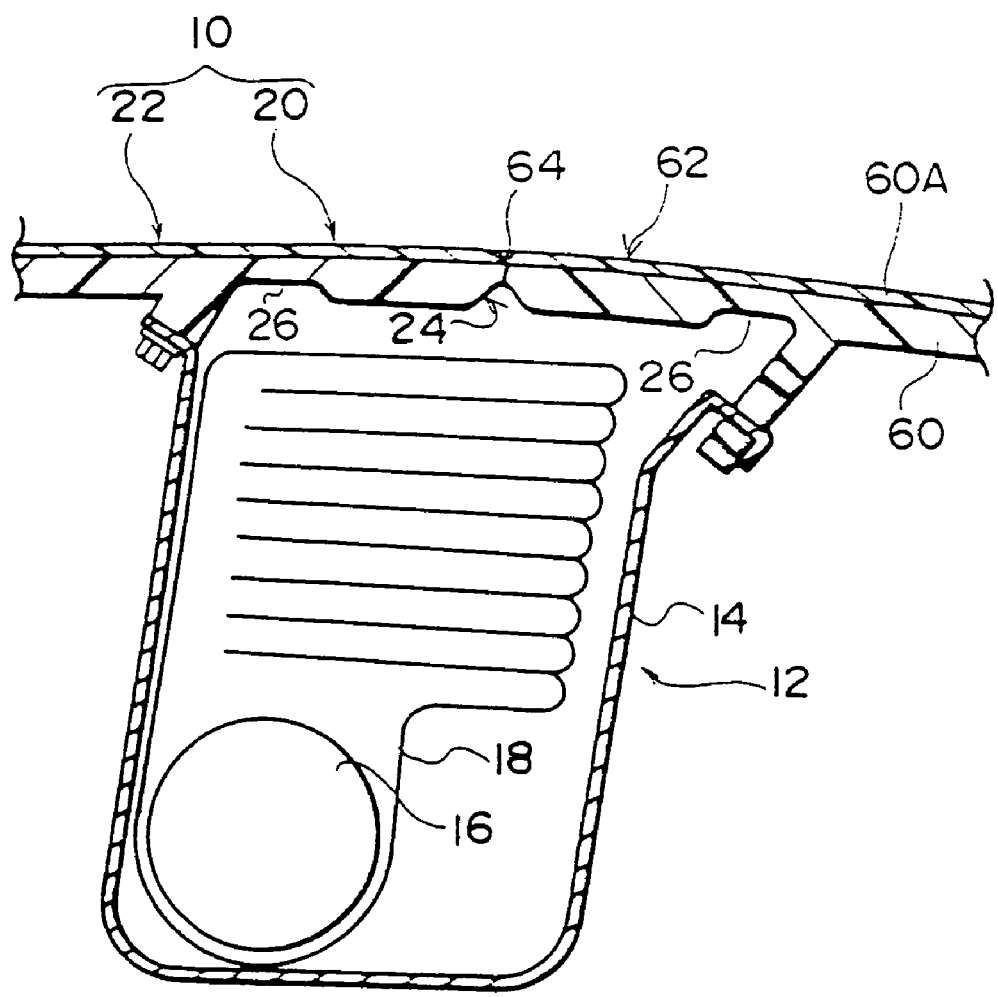
FIG. 34 is a cross-sectional view corresponding to FIG. 24 which shows the interior member for the automotive vehicle integrally having the air bag door portion in accordance with the applied embodiment of the eighth embodiment of the present invention.

Further, the forming method in accordance with the eighth embodiment can be applied to the instrument panel 10 as a so-called skin insert-and skin attachment-type trim member for an automotive vehicle, which comprises the base member 60 and the skin 62 for covering the outer appearance 60A of the base member 60, as shown in FIG. 34; in this case, the tear portion 64 is formed along the groove 24 on the skin 62 and it is set so that the skin 62 can be easily broken when the bag body of the air bag is expanded. Otherwise, even when the tear portion 64 is not provided, local tension is generated at the time of expansion since the air bag door portion is made of the material having great rigidity, so that the skin 62 is easily broken. Further, as the skin 62 indicated here, in a case of the skin insert, in addition to the skin 62 having a single layer as shown in FIG. 17A, the skin 62 having two layers as shown in FIG. 17B and the skin 62 having three layers as shown in FIG. 17C may be used.

Further, in a case of the attachment type, in addition to the skin 62 having a single layer as shown in FIG. 18A, the skin 62 with the foam layer 63 as shown in FIG. 18B may be used.

Figure 35:
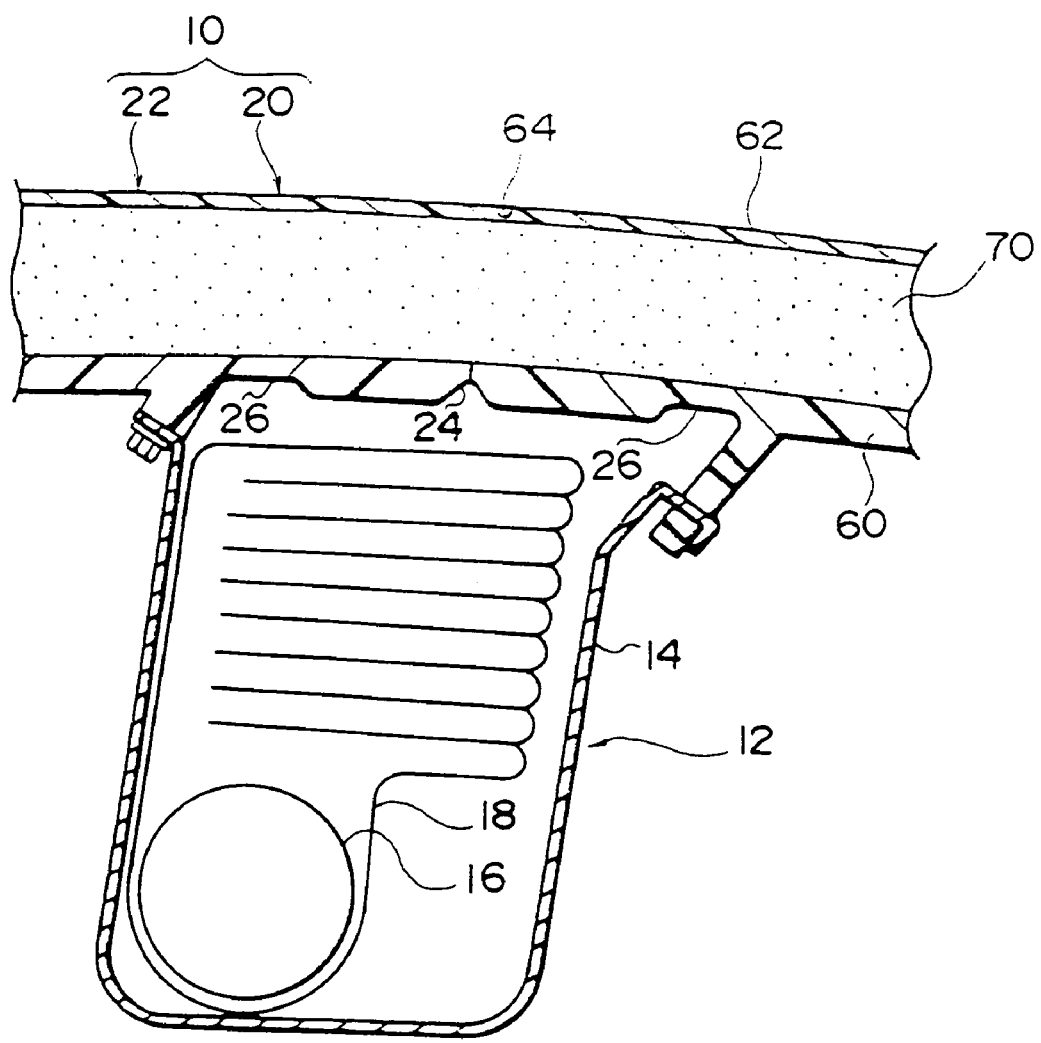
FIG. 35 is a cross-sectional view corresponding to FIG. 24 which shows an interior member for an automotive vehicle integrally having an air bag door portion in accordance with another applied embodiment of the eighth embodiment of the present invention.

Still further, the forming method in accordance with the eighth embodiment can be applied to the instrument panel 10 as a so-called integral foam type trim member for an automotive vehicle which comprises the base member 60, the skin 62 and the foam layer 70 between the base member 60 and the skin 62, as shown in FIG. 35.

Further, the tear portion 64 formed on the skin 62 as shown in FIGS. 34 and 35 may be formed from the reverse face side as well as from the obverse face side. Moreover, the shape of the tear portion 64 is not limited to a U-shaped groove cross section, but may be other shapes such as a V-shaped groove cross section, a slit shape or the like.

Figure 38:
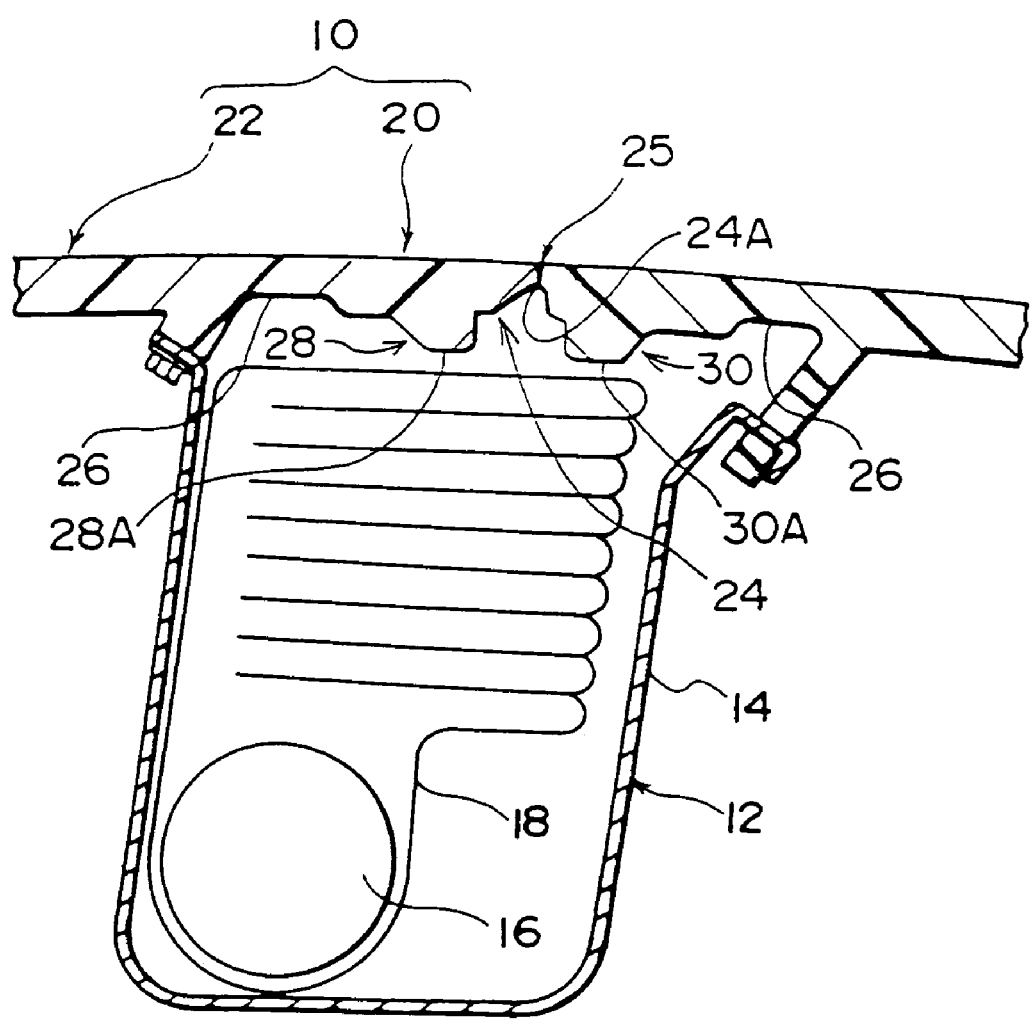
FIG. 38 is a cross-sectional view corresponding to FIG. 24 showing an interior member for an automotive vehicle integrally having an air bag door portion in accordance with another embodiment of the present invention.
Figure 39:
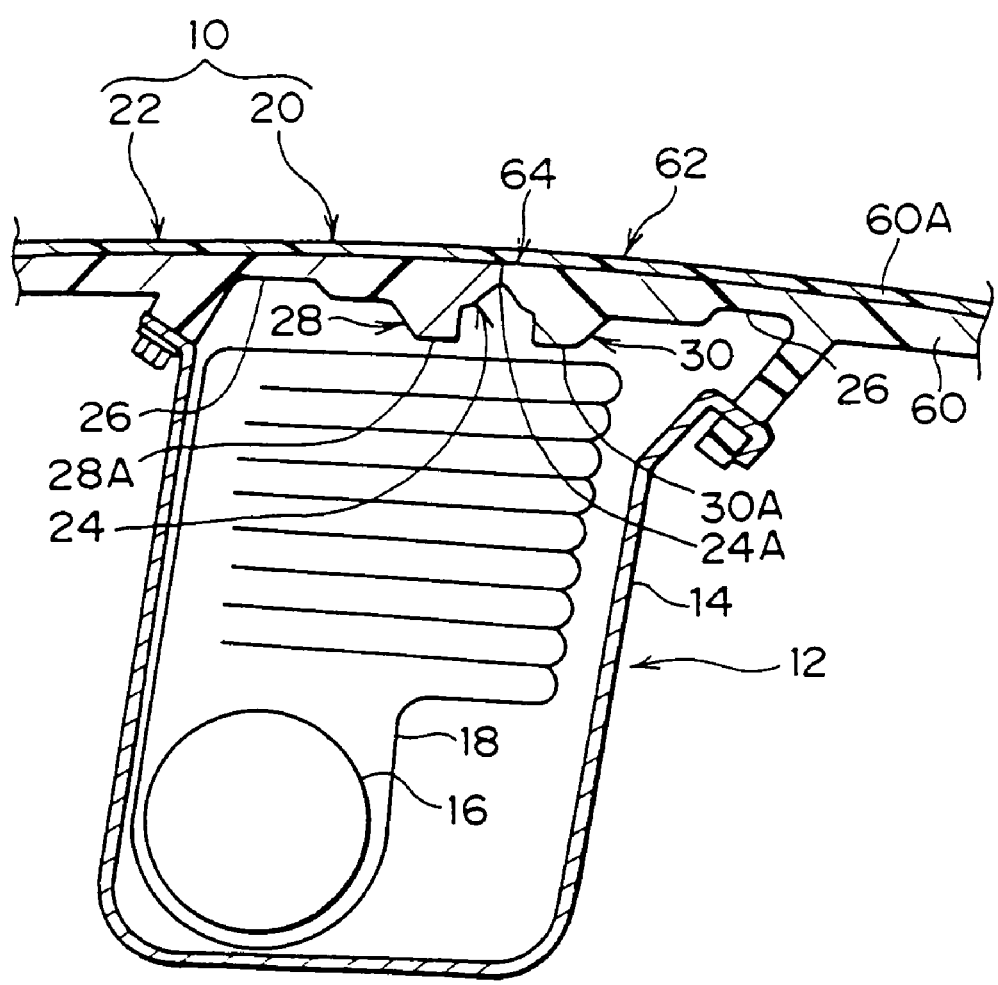
FIG. 39 is a cross-sectional view corresponding to FIG. 24 showing an interior member for an automotive vehicle integrally having an air bag door portion in accordance with another embodiment of the present invention.
Figure 40:
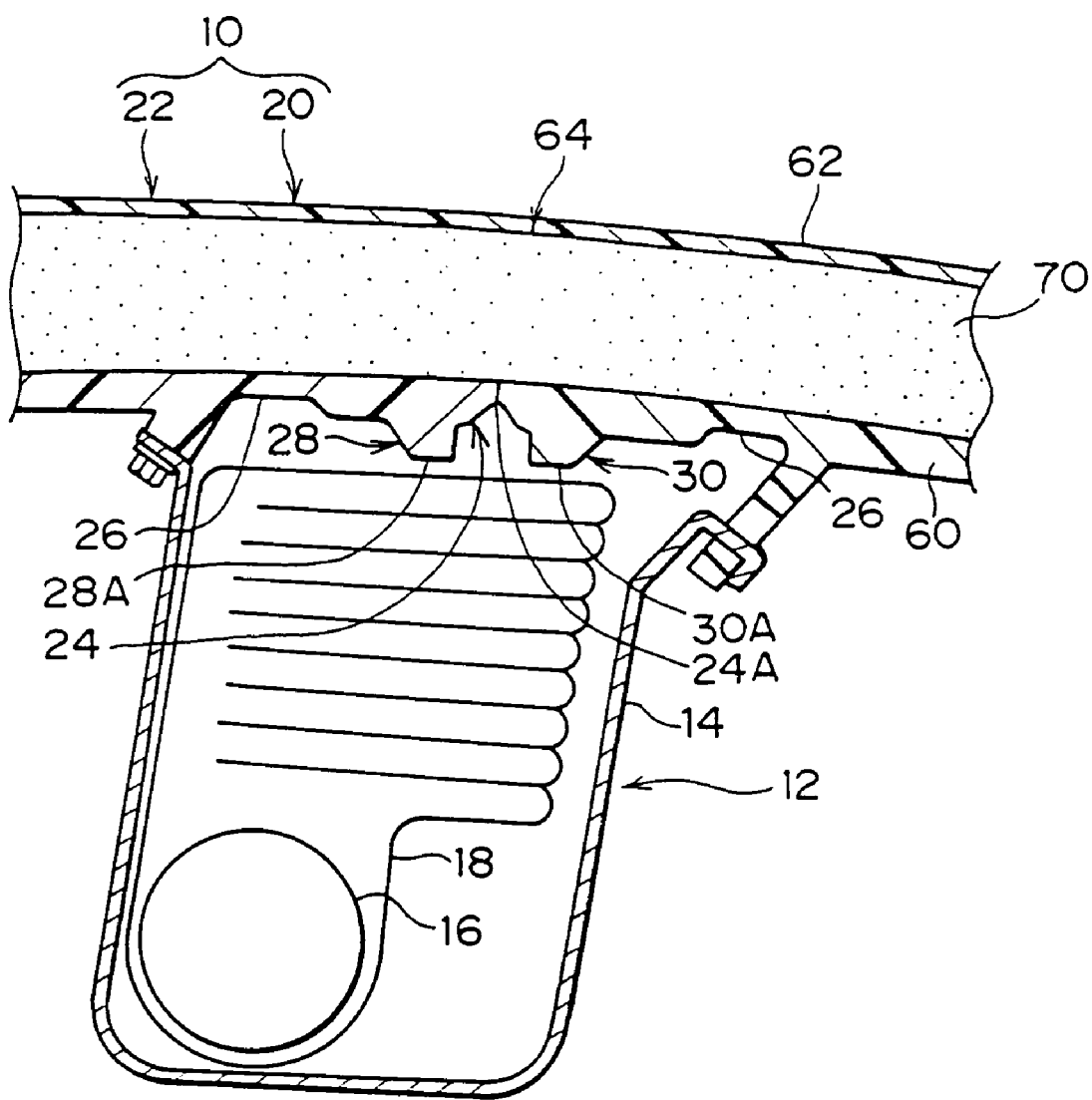
FIG. 40 is a cross-sectional view corresponding to FIG. 24 showing an interior member for an automotive vehicle integrally having an air bag door portion in accordance with another embodiment of the present invention.

Further, the present invention may be structured as shown in FIG. 38 by disposing the protrusions 28 and 30, as the push-up means in accordance with the first embodiment as shown in FIG. 1, in the instrument panel 10, as the trim member for the automotive vehicle in accordance with the eighth embodiment as shown in FIG. 24. Still further, the present invention may be structured as shown in FIG. 39 by disposing the protrusions 28 and 30, as the push-up means in accordance with the first embodiment as shown in FIG. 1, in the instrument panel 10, as the trim member for the automotive vehicle having the integrally formed air bag door portion in accordance with the applied embodiment of the eighth embodiment as shown in FIG. 34. Further, the present invention may be structured as shown in FIG. 40 by disposing the protrusions 28 and 30, as the push-up means in accordance with the first embodiment as shown in FIG. 1, in the instrument panel 10, as the trim member for the automotive vehicle having the integrally formed air bag door portion in accordance with the other applied embodiment of the eighth embodiment as shown in FIG. 35.

INDUSTRIAL APPLICABILITY

As mentioned above, the trim member for the automotive vehicle having the air bag door portion in accordance with the present invention and the method of forming the same are useful for forming the air bag door portion of the trim member for the automotive vehicle and the main body portion of the trim member for the automotive vehicle by the same resin, and are particularly suitable for decreasing the break force of the break portion of the air bag door portion to a desired value without reducing the quality of the outer appearance.

What is claimed is:

1. A trim member for an automotive vehicle, comprising:
a main body portion that is formed of a hard resin material;
an air bag door portion, wherein:
the air bag door portion is formed of a same hard resin material as the main body portion,
the air bag door portion is integrally formed with the main body portion,
a tear portion is formed in the air bag door portion, and
a hinge portion is formed in the air bag door portion as a thin portion having a predetermined thickness across a predetermined longitudinal width and is adjacent to a case mounting portion; and
at least two door hinge portion protecting plates disposed below and separate from the air bag door portion, each door hinge portion protecting plate protruding toward a side of the tear portion rather than toward the hinge portion of the air bag door portion and having a high break force, wherein a predetermined spacing is provided between each door hinge portion protecting plate and a lower surface of the air bag door portion and a predetermined spacing is provided between each door hinge portion protecting plate.

2. A trim member for an automotive vehicle, comprising:
a main body portion that is formed of a hard resin material;
an air bag door portion, wherein:
the air bag door portion is formed of a same hard resin material as the main body portion,
the air bag door portion is integrally formed with the main body portion,
a tear portion is formed in the air bag door portion which is not visible from an outer appearance with a part of the tear portion located at the center of the air bag door portion, and
a hinge portion is formed in the air bag door portion as a thin portion have a predetermined thickness across a predetermined longitudinal width and is adjacent to a case mounting portion; and
force concentrating means, at least one of the force concentrating means positioned below and separate from the air bag door portion and adjacent to a lower surface side of the air bag door portion, for pushing up at least one side of the air bag door portion located on either side of the part of the tear portion located at the center of the air bag door portion when a bag body of an air bag is expanded, wherein a predetermined spacing is provided between the force concentrating means and a lower surface of the air bag door portion.

3. The trim member for an automotive vehicle according to claim 2, wherein the force concentrating means is disposed at the lower surface side of the air bag door portion, and is a metal plate providing a protrusion on at least one of an upper surface or a lower surface of a distal end portion that abuts, when the air bag body is expanded, at least one side of the air bag door portion located on either side of the part of the tear portion located at the center of the air bag door portion.

4. The trim member for an automotive vehicle according to claim 2, wherein the force concentrating means is disposed at the lower surface side of the air bag door portion and is a metal plate providing a narrow protrusion at an upper surface of a distal end portion that abuts, when the air bag body is expanded, at least one side of the air bag door portion located on either side of the part of the tear portion located at the center of the air bag door portion when the air body of the air bag is expanded.

5. The trim member for an automotive vehicle according to claim 2, wherein;
the force concentrating means is disposed at the lower surface side of the air bag door portion and is a metal plate providing a distal end portion that abuts, when the air bag body is expanded, at least one side of the air bag door portion located on either side of the part of the tear portion located at the center of the air bag door portion;
a hinge portion of the metal plate is off set with respect to the tear portion more than the hinge portion of said air bag door portion; and
a portion of the metal plate between the hinge portion and an end opposite the distal end has more rigidity than the hinge portion.

* * * * *